(12) United States Patent
Zöller

(10) Patent No.: US 10,571,936 B2
(45) Date of Patent: Feb. 25, 2020

(54) DEVICE FOR FORMING A HEAD PART OF A LIQUID TREATMENT APPARATUS AND LIQUID TREATMENT APPARATUS

(71) Applicant: BRITA GmbH, Taunusstein (DE)

(72) Inventor: Jochen Zöller, Nastätten (DE)

(73) Assignee: BRITA GmbH, Taunusstein (DE)

( * ) Notice: Subject to any disclaimer, the term of this patent is extended or adjusted under 35 U.S.C. 154(b) by 235 days.

(21) Appl. No.: 15/565,140

(22) PCT Filed: Apr. 8, 2016

(86) PCT No.: PCT/EP2016/057742
§ 371 (c)(1),
(2) Date: Oct. 6, 2017

(87) PCT Pub. No.: WO2016/162476
PCT Pub. Date: Oct. 13, 2016

(65) Prior Publication Data
US 2018/0088600 A1 Mar. 29, 2018

(30) Foreign Application Priority Data
Apr. 9, 2015 (EP) .................................. 15162967

(51) Int. Cl.
*G05D 7/06* (2006.01)
*C02F 1/42* (2006.01)
(Continued)

(52) U.S. Cl.
CPC ........... *G05D 7/0635* (2013.01); *B01D 61/12* (2013.01); *B01D 61/22* (2013.01); *C02F 1/283* (2013.01);
(Continued)

(58) Field of Classification Search
CPC ........ B01D 2201/302; B01D 2201/303; B01D 2313/18; B01D 61/025; B01D 61/027;
(Continued)

(56) References Cited

U.S. PATENT DOCUMENTS 8,505,741 B2 * 8/2013 Scholz ................. B01D 35/153
210/420
2005/0167352 A1 8/2005 Burrows et al.
(Continued)

FOREIGN PATENT DOCUMENTS

EP 0890774 A1 1/1999
EP 1 106 578 A1 6/2001
(Continued)

OTHER PUBLICATIONS

International Preliminary Report on Patentability as received in PCT/EP2016/057742 dated Oct. 19, 2017.

*Primary Examiner* — Terry K Cecil
(74) *Attorney, Agent, or Firm* — Keller Jolley Preece

(57) ABSTRACT

A device for forming at least part of a head part of a liquid treatment apparatus is arranged to receive a connecting head of a replaceable liquid treatment cartridge and includes at least one ratio-setting valve. The ratio-setting valve is provided with at least two first ports, each placeable in essentially sealed liquid communication with respective cartridge ports of a connecting head of a replaceable liquid treatment cartridge inserted into the device, and with at least one second port. The ratio-setting valve includes at least one movable regulating part for setting a volumetric flow rate ratio between a first flow of liquid between a first of the first ports and the at least one second port and a second flow of liquid between a second of the first ports and the at least one second port at any of a plurality of values.

20 Claims, 19 Drawing Sheets

(51) Int. Cl.
  *C02F 1/28*   (2006.01)
  *C02F 1/44*   (2006.01)
  *B01D 61/12*  (2006.01)
  *B01D 61/22*  (2006.01)
  *F16K 3/04*   (2006.01)
  *B01D 61/02*  (2006.01)
  *B01D 61/14*  (2006.01)
(52) U.S. Cl.
  CPC ............... *C02F 1/42* (2013.01); *C02F 1/441* (2013.01); *F16K 3/04* (2013.01); *B01D 61/025* (2013.01); *B01D 61/027* (2013.01); *B01D 61/147* (2013.01); *B01D 2201/303* (2013.01); *B01D 2313/18* (2013.01); *C02F 2001/425* (2013.01); *C02F 2201/005* (2013.01); *C02F 2201/006* (2013.01); *C02F 2301/043* (2013.01)
(58) Field of Classification Search
  CPC ...... B01D 61/12; B01D 61/147; B01D 61/22; C02F 2201/005; C02F 1/283; C02F 1/42; C02F 1/441; C02F 2001/425; C02F 2201/006; C02F 2301/043; F16K 3/04; G05D 7/0635
  See application file for complete search history.

(56)  References Cited

U.S. PATENT DOCUMENTS

| | | |
|---|---|---|
| 2007/0215531 A1 | 9/2007 | Wawrla et al. |
| 2012/0325732 A1 | 12/2012 | Scholz et al. |
| 2014/0374336 A1 | 12/2014 | Sherman et al. |

FOREIGN PATENT DOCUMENTS

| | | |
|---|---|---|
| GB | 2 465 622 A | 6/2010 |
| WO | WO 2016110321 A1 | 7/2016 |

* cited by examiner

DEVICE FOR FORMING A HEAD PART OF A LIQUID TREATMENT APPARATUS AND LIQUID TREATMENT APPARATUS

CROSS-REFERENCE TO RELATED APPLICATIONS

This application is a national phase entry under 35 U.S.C. § 371 of International Application No. PCT/EP2016/057742, filed Apr. 8, 2016 which claims the benefit of European Application No. 15162967.2, filed Apr. 9, 2015. The entire contents of each of the foregoing patent applications are hereby incorporated by reference.

SUMMARY

The invention relates to a device for forming at least part of a head part of a liquid treatment apparatus,
which device is arranged to receive a connecting head of a replaceable liquid treatment cartridge and includes at least one ratio-setting valve,
wherein the ratio-setting valve is provided with at least two first ports, each placeable in essentially sealed liquid communication with respective cartridge ports of a connecting head of a replaceable liquid treatment cartridge inserted into the device, and with at least one second port,
wherein the ratio-setting valve includes at least one movable regulating part for setting a volumetric flow rate ratio between a first flow of liquid between a first of the first ports and the at least one second port and a second flow of liquid between a second of the first ports and the at least one second port at any of a plurality of values, and
wherein the ratio-setting valve is placeable in a closed configuration, in which the at least one movable regulating parts are positioned such that both the first and the second flows are blocked.

The invention also relates to a liquid treatment apparatus including a head part including at least one device according to any one of the preceding claims and at least one replaceable liquid treatment cartridge.

US 2007/0215531 A1 discloses a water treatment appliance including a connection head as a connection element and a filter candle as an interchangeable element. The connection comprises an entry line and an exit line. The connection head is integrated in a water-channelling system via the entry line and the exit line. The entry line is connected to a throttle unit formed from three perforated disks. In the throttle unit, the water path is divided up into two flow paths. The flow paths open out into a connection cone. The filter candle has a conical hollow that corresponds to the connection cone and is connected to the connection cone in a form-fitting manner via threads as the filter candle is screwed into the connection head. A central flow path is thus connected to a central line and a further flow path is connected to a bypass line. Via a filter section in the interior of the filter candle, treated filtrate passes into the region of an annular outlet line, which is connected directly to the bypass line. The treated water from the central line thus passes, together with the untreated water channelled via the bypass line, into an outlet line, in which case water which has already been mixed to the preset mixing ratio is present here. Various positions of the perforated disks in relation to one another result in different flow states. In a blocking state, the perforated disks form a shut-off valve, i.e. in this state the filter candle can easily be removed and replaced. When a filter candle is inserted, carry-along elements of the connection cone and corresponding recesses in the end side of the hollow cause the connection cone to be rotated along as well, as a result of the screwing-in-action. The bottom perforated disk and the central perforated disk are carried along via carry-along elements, and this achieves an open state. The incoming water flow is divided up into two flow paths via a recess of the central perforated disk.

Appliances of this type are frequently arranged in series in order to effect different types of water treatment sequentially. Regardless of this, they are generally connected directly to one or more downstream appliances that use the treated water, e.g. dishwashers, coffee machines and the like. These may occasionally need to be serviced or replaced, in which case the water supply from the appliance, but preferably not the mains water supply will need to be cut off. The same may be the case if one of a series of water treatment devices requires servicing or replacement. One could provide valves between the water treatment device and the downstream device or appliance. However, in case of a series of head devices, these often form a unit without the possibility of inserting valves. In any case, each such valve introduces an extra pressure drop, even when open. With the known appliance, the supply can be cut off by removing the filter candle, but this is cumbersome.

It is an object of the invention to provide a device and apparatus of the types mentioned above in the opening paragraphs that allow for the servicing of downstream apparatus or appliances without the need to remove the cartridge.

This object is achieved according to a first aspect by the device according to the invention, which device is characterised in that the ratio-setting valve is placeable in the closed configuration independently of whether a connecting head is inserted with its cartridge ports in liquid communication with the first ports.

The ratio-setting valve will also be referred to herein as a blending valve. Because the ratio-setting valve is placeable in the closed configuration independently of whether a connecting head is inserted with its cartridge ports in liquid communication with the first ports and because the at least one movable regulating parts are positioned such that both the first and second flows are blocked in the closed configuration, the cartridge need not be manipulated to block the flow of liquid provided by the assembly of device and cartridge to downstream assemblies or appliances. Because the ratio-setting valve performs this function, there is no need to provide a separate valve. This helps keep the pressure drop due to the liquid treatment relatively low. Moreover, it is possible to integrate several devices for forming a liquid treatment apparatus when a respective replaceable liquid treatment cartridge is inserted in them into one multi-head device and to cut off the flow of liquid between the assemblies.

The device is suitable for use with liquid treatment cartridges provided with at least three cartridge ports in liquid communication with an interior of the cartridge, of which at least two are provided in the connecting head.

One such cartridge includes at least one certain liquid treatment part. It is arranged to conduct a first fraction of liquid to be treated through the certain liquid treatment part and a second fraction along a flow path bypassing the certain liquid treatment part. The ratio-setting valve may be located upstream of the cartridge for example. If it is located upstream of the liquid treatment cartridge, the first ports are in liquid communication with cartridge inlet ports. Liquid entering the cartridge through a first of the cartridge inlet ports passes through the certain liquid treatment part. Liquid entering the cartridge through a second of the cartridge inlet ports bypasses the certain liquid treatment part. The two flows may be combined within the cartridge to provide a mix through at least one cartridge outlet port, for example. The ratio of liquid conducted through the certain liquid treatment part to that bypassing the certain liquid treatment part can be set by means of the ratio-setting valve.

Another such cartridge includes a membrane module. It has at least one cartridge port functioning as an inlet and at least two cartridge ports functioning as outlets. One outlet provides filtrate. The other outlet provides retentate. Examples include cartridges for microfiltration, nanofiltration or reverse osmosis. In particular where the cartridge is a reverse osmosis cartridge, it may be desirable not to provide pure filtrate for drinking purposes, but to adjust the total dissolved solids (TDS) concentration according to the intended application. If the ratio-setting valve is located downstream of the liquid treatment cartridge, the first ports are in liquid communication with the cartridge ports functioning as outlets. A certain amount of the retentate can be admixed to the filtrate. Mixing takes place in the ratio-setting valve at a ratio determined by the position(s) of the at least one movable regulating parts.

In the closed configuration, either no liquid can reach the cartridge or none of the treated liquid from the cartridge can flow beyond the ratio-setting valve. This is also the case if the cartridge ports of the connecting head are still in sealed liquid communication with the first ports. It thus suffices to change the ratio-setting valve configuration to make the liquid treatment apparatus comprising the device and the replaceable liquid treatment cartridge operational again. The device includes a device independent of the cartridge for moving the valve into and out of the closed configuration in the presence of a cartridge having a connecting head inserted with its cartridge ports in liquid communication with the first ports.

An embodiment of the device further includes:
  a receiving part including at least one cavity for receiving at least a part of the connecting head including at least one of the cartridge ports such that the cartridge port is in sealed liquid communication with a receiving part port; and
  at least one valve mechanism, operable by the liquid treatment cartridge, for interrupting flows of liquid between the first ports and respective ones of the receiving part ports.

This embodiment avoids that liquid leaks from the device when the connecting head is not correctly inserted or not inserted at all. It is not necessary to rely on an operator to place the ratio-setting valve in the closed configuration before removing the cartridge, because the valve mechanism is operable by the liquid treatment cartridge such that the flows of liquid are interrupted through movement of the cartridge to allow the connecting head to be retracted. The cartridge ports may be provided on protuberances forming the connecting head, with each protuberance being received in a respective cavity. Alternatively, there may be one concave connecting head in which the cartridge ports are provided and which is received in a single cavity such that each of the cartridge ports of the connecting head is in sealed liquid communication with a respective receiving part port. The sealing separates the flows of liquid through the cartridge ports from each other as well as preventing leaks through the mouth of the cavity.

In a variant, the at least one valve mechanism is additional to the ratio-setting valve.

It is thus possible to interrupt the flow of liquid to or from the cartridge by removing the cartridge or by placing the ratio-setting valve in the closed configuration. The latter option is also available when the cartridge is in its operational position of engagement with the device. Compared to a variant in which the removal or insertion of the connecting head operates the ratio-setting valve, the ratio-setting valve can be less complicated in this embodiment. For example, there is no need to provide an electromechanical actuator and sensor or to provide the ratio-setting valve close to the receiving part to enable the presence of the liquid treatment cartridge to be sensed mechanically.

In an embodiment in which the device further includes a receiving part including at least one cavity for receiving at least a part of the connecting head including at least one of the cartridge ports such that the cartridge port is in sealed liquid communication with a receiving part port; and at least one valve mechanism, operable by the liquid treatment cartridge, for interrupting flows of liquid between the first ports and respective ones of the receiving part ports, the device includes a part, e.g. the receiving part, for engaging the liquid treatment cartridge when the connecting head is inserted into the device, e.g. into the cavity of the receiving part, wherein the liquid treatment cartridge is movable with the engaging part between a first and a second position relative to a main part of the device whilst the connecting head is inserted, and wherein a position of the engaging part relative to the main part determines a state of the valve mechanism, the first ports being in liquid communication with the receiving part ports only in the second of the first and second positions.

The valve mechanism is thus operated mechanically by the liquid treatment cartridge. There is no need to provide a system with a sensor and electromechanical actuator for operating the valve mechanism in response to a detection of the liquid treatment cartridge. If the receiving part is the engagement part, there is no need to provide separate features on the cartridge or connecting head that can be engaged by the engagement part. This provides more space for the cartridge ports.

In a variant of this embodiment, the receiving part is arranged to function as a movable valve member of the valve mechanism such that at least two, e.g. all, of valve mechanism ports of the receiving part that are at least in liquid communication with the receiving part ports are aligned in the second position with respective valve mechanism ports of the main part that are at least in liquid communication with the first ports, and the valve mechanism ports of at least one of the receiving part and the main part aligned in the second position are blocked by a respective wall section of the other of the receiving part and the main part in the first position.

Ports of the receiving part that are at least in liquid communication with the receiving part ports may correspond to the receiving part ports mentioned previously or be in liquid communication with them via channels or other conduits in the receiving part. In an embodiment, they correspond and are provided in respective side wall sections of the receiving part delimiting the cavity. The receiving part can then be relatively compact. Likewise, ports of the main part that are at least in liquid communication with the first ports may correspond to the first ports or be in liquid communication with them via channels or other conduits in the main part. The valve mechanism of this embodiment functions rather like a sliding gate valve. It is relatively compact compared to a valve with a movable valve member received in a seat. Moreover, it is more suitable for a receiving part journalled for movement along a locus in and defining a plane of movement, since the plane of movement can be essentially parallel to the wall sections that block ports in the first position. This allows for a relatively complicated locus of movement. Also, the valve mechanism ports can be placed side-by-side. At positions close to but not quite corresponding to the second position, seals around the valve mechanism ports can ensure that there is a reduced transfer of liquid but no leakage into the cavity.

In an embodiment in which the device further includes:
a receiving part including at least one cavity for receiving at least a part of the connecting head including at least one of the cartridge ports such that the cartridge port is in sealed liquid communication with a receiving part port; and
at least one valve mechanism, operable by the liquid treatment cartridge, for interrupting flows of liquid between the first ports and respective ones of the receiving part ports,
the device includes at least one inlet and at least one outlet for liquid,
wherein the second port is at least placeable in liquid communication with one of at least one of the inlets and one of the outlets, and
wherein the valve mechanism is arranged to place the first ports in liquid communication with the other of at least one of the inlet and at least one of the outlets when the flows of liquid between the first ports and respective ones of the receiving part ports are interrupted.

It is thus possible to pass liquid through the device also in the absence of a liquid treatment cartridge. This is especially useful in a multi-head apparatus in which several devices are arranged in series to effect different types of treatment in cartridges of different types. In case of changing requirements, a certain type of treatment can be omitted without having to dismount the device that was to receive the cartridge for effecting this type of treatment.

In an embodiment combining the above two embodiments, at least one channel is formed in the receiving part, and the channel is arranged, in at least the first position, to place at least one of the valve mechanism ports of the main part aligned with a respective valve mechanism port of the receiving part in the second position in sealed liquid communication with at least one other of the valve mechanism ports of the main part aligned with a respective valve mechanism port of the receiving part in the second position.

This is a relatively compact and simple to implement embodiment. The channel passes through the receiving part, bypassing the cavity in which the connecting head of the liquid treatment cartridge is received.

An embodiment of the device includes a receiving part including at least one cavity for receiving at least a part of the connecting head including at least one of the cartridge ports such that the cartridge port is in sealed liquid communication with a receiving part port, wherein the receiving part is journalled for movement between a first and a second position with respect to a main part of the whilst the connecting head is inserted, and wherein a locus of movement between the first and second position is in a single plane defined by the locus.

Given that the locus defines the plane, it differs from a straight line, but may be a circle or more complicated shape. Compared with a device in which the movement is in a straight line, the main part, in particular any housing in which the receiving part is journalled for movement, can be more compact. In this type of liquid treatment apparatus, the liquid treatment cartridge generally depends from the device in the operational position of the liquid treatment cartridge. Straight-line movements are undesirable, because they require extra clearance from the ground to enable the liquid treatment cartridge to be inserted and retracted. Furthermore, most types of liquid treatment apparatus in which the cartridge is connected to the device for receiving it by means of a straight-line movement use a bayonet-type or screw-fit lock to hold the liquid treatment cartridge in place. Both require a rotation about the line of movement, generally about the longitudinal axis of the cartridge. This requires a relatively large force. When the receiving part is journalled for movement between a first and a second position with respect to a main part of the device whilst the connecting head is inserted and the locus of movement between the first and second position is in a single plane defined by the locus, there can be a swivelling type of motion of the liquid treatment cartridge, allowing it to function as a lever.

In a variant of this embodiment, the movement of the receiving part between the first and second positions is a combination of an internal rotation and a displacement of the receiving part.

The internal rotation with the connecting head inserted corresponds to a swivelling motion of the liquid treatment cartridge about an axis of rotation perpendicular to the plane. This allows the cartridge to function as a lever. Because the rotation is combined with a displacement of the receiving part, an end of the cartridge distal to the device can be moved over a larger distance, for example away from a wall to which the device is mounted, without having to resort to large angles of rotation. Where the receiving part is comprised in the valve mechanism, it is possible to use relatively large valve mechanism ports and still ensure that those of the receiving part do not overlap those of the main part in the first position.

An embodiment of the device includes a receiving part including at least one cavity for receiving at least a part of the connecting head including at least one of the cartridge ports such that the cartridge port is in sealed liquid communication with a receiving part port, wherein the receiving part is journalled for movement between a first and a second position with respect to a main part of the device whilst the connecting head is inserted, and wherein the device, e.g. the main part, includes retainment parts for retaining the liquid treatment cartridge to the device such that the connecting head is insertable and retractable in only the first of the first and second positions.

Thus, movement of the receiving part with the connecting head inserted from the first to the second position locks the cartridge to the device. Movement from the second to the first position unlocks it. Where the main part includes the retainment parts and the cartridge is suspended from the device in the operational position of the cartridge, the parts for journaling the receiving part for movement need not be so robust, since they do not carry the full weight of the liquid treatment cartridge.

In an embodiment of the device, the device is provided with at least one inlet and at least one outlet for liquid and at least two of the ratio-setting valves, wherein the second port of a first of the ratio-setting valves is at least placeable in liquid communication with at least one of the inlets and the second port of a second of the ratio-setting valves is at least placeable in liquid communication with at least one of the outlets.

The first of the ratio-setting valves may thus be in liquid communication with the inlet or in liquid communication with the inlet via one or more valve and thus placeable in liquid communication with the inlet by setting the valves appropriately. In this embodiment, it is possible to reverse the direction of flow such that the inlets become outlets and vice versa. This is of use where the device is for mounting to a wall, since one is not limited to a particular direction of flow along the wall. The downstream ratio-setting valve can simply be set at a ratio of 1:1 and combine two flows of identical composition into one, for example.

An embodiment of the device includes a receiving part including a cavity provided with multiple receiving part ports, e.g. at least three or at least four, placeable in sealed liquid communication with respective cartridge ports on insertion of the connecting head into the cavity.

Where there are three ports, it is possible to use a liquid treatment cartridge with an internal bypass and having all the ports in the connecting head, i.e. at one end of the liquid treatment cartridge. Alternatively, it is possible to use a cartridge including a membrane module operated in cross-flow mode to produce filtrate and retentate and have all the ports (one inlet port, an outlet port for filtrate and an outlet port for retentate) at one end of the cartridge.

Where there are four ports, it is possible to use a high-throughput cartridge having a balanced number of inlets and outlets, even if only three are required to implement a liquid treatment cartridge with an internal bypass or with a membrane module operated in cross-flow mode. Furthermore, an embodiment with four ports can usefully be combined with the embodiment discussed above in which the direction of flow can be chosen according to circumstances.

An embodiment of the device includes a movable operating part for at least placing the ratio-setting valve in and out of the closed configuration.

The operating part is for operation by a user, thus externally accessible. It may comprise a socket for a tool, e.g. a socket for an Allen key or the like. This embodiment does not require separately powered actuators and control panels or buttons in order to set the flow rate ratio or place the ratio-setting valve into or out of the closed configuration.

In a variant of this embodiment, the movable operating part is graspable by an operator.

This avoids the need for tools. The movable operating part can be manipulated by hand.

In an embodiment including a movable operating part for at least placing the ratio-setting valve in and out of the closed configuration, the movable operating part is journalled for rotation about an axis fixed with respect to the device.

This allows the device to be relatively compact yet the operating part to move over a relatively wide range. In turn, the movable regulating part or parts can move over a relatively wide range without the need for a geared transmission mechanism.

In a variant of this embodiment, the movable operating part is arranged such that liquid conducted through at least one of (i) the first ports and (ii)
the second port is led through a central section of the movable operating part.

In this embodiment, the valve is relatively compact. The regulating part or parts can carry out a rotary movement coupled to the rotary movement of the movable operating part, with the direction of flow between the first ports and the second port being essentially through the plane of rotation. Any empty space forming a valve chamber in a valve housing can be relatively small. The movable operating part can form part of the valve housing.

In a variant of this embodiment, the second port is formed in the movable operating part.

It suffices to have a single second port, whereas at least two first ports are required. The single second port can be centred on the axis of rotation of the movable operating part. The latter can be essentially annular in shape. It is possible to combine a relatively large, e.g. circular, second port with a relatively small movable operating part.

In an embodiment, the at least one movable regulating parts include a regulating part having a surface sealingly placed against the first ports and having an aperture therein, the aperture being movable between positions of varying degrees of overlap with the first ports and into at least one position out of overlap with any of the first ports.

This is a relatively simple and compact way of implementing the ratio-setting valve. The ports may be round, e.g. essentially circular, but the ratio still vary linearly with the position of at least the movable regulating part, by giving the aperture an appropriate shape.

In a variant of this embodiment, the regulating part is rotatable and the positions correspond to rotary positions.

This also helps keep the valve relatively compact. The first ports can be completely covered and uncovered without having to displace the movable regulating part over a large distance.

In an embodiment including a movable operating part for at least placing the ratio-setting valve in and out of the closed configuration, wherein the at least one movable regulating parts include a regulating part having a surface sealingly placed against the first ports and having an aperture therein, the aperture being movable between positions of varying degrees of overlap with the first ports and into at least one position out of overlap with any of the first ports, the regulating part is one of coupled for movement with and comprised in the movable operating part.

This avoids the need for complex linkages. Where the regulating part is coupled for movement with the movable operating part as opposed to being integral with it, the movable operating part is easier to manufacture. It need not be provided with channels or channel apertures with a complex shape.

In an embodiment of the device, the first ports are provided in a screening part inserted through an aperture of a housing part of the device.

This allows a manufacturer to implement a modular range of devices using the same housing parts. Where there is no need for a ratio-setting valve, there can be fewer ports. Only a different screening part is required for this.

An embodiment of the device further includes:
at least one device for detecting a fault in the liquid treatment apparatus, e.g. a leak, and
an actuator for placing the ratio-setting valve in the closed configuration on detection of the fault.

The actuator may be an electric motor, e.g. a linear motor or a stepper motor. In an embodiment, the electric motor is part of a system for setting the volumetric flow rate ratio in dependence on at least one measurement signal for measuring a property of at least one of the treated and the untreated liquid.

According to another aspect, the liquid treatment apparatus according to the invention includes a head part including at least one device according to the invention and at least one replaceable liquid treatment cartridge.

The head part may include multiple devices in order to effect liquid treatment in multiple cartridges sequentially or in parallel.

In an embodiment of the liquid treatment apparatus, at least three, e.g. at least four, cartridge ports in liquid communication with an interior of the liquid treatment cartridge are provided in the connecting head.

In the case of at least three cartridge ports, the liquid treatment cartridge can be a cartridge with an internal bypass past a certain liquid treatment part, yet still have all the cartridge ports in the connecting head, i.e. at one end of the liquid treatment cartridge. It can alternatively comprise a cross-flow membrane module and have all the cartridge ports in the connecting head. There is thus no need to place a further device in liquid communication with cartridge ports at the other end of the cartridge. In the case of at least four cartridge ports, the cartridge can be a high-throughput cartridge having a balanced number of inlet and outlet cartridge ports. These may be of the same size and shape without one of them limiting the rate of flow through the liquid treatment cartridge.

In an embodiment of the liquid treatment apparatus, the liquid treatment cartridge has a cartridge axis essentially aligned with the direction of insertion of the connecting head, and at least one, e.g. all of the cartridge ports provided in the connecting head is provided in a respective surface section facing in a direction at an angle to the cartridge axis, e.g. an angle larger than 45°.

There is thus no need to place concentric ports facing in longitudinal direction at a longitudinal end of a liquid treatment cartridge. Rather, the cartridge ports are placed in side surface sections of the connecting head. This also makes it easier to ensure that liquid communication between the cartridge ports and ports of the device is sealed.

In an embodiment of the apparatus, the liquid treatment cartridge has a cartridge axis essentially aligned with the direction of insertion of the connecting head, and the liquid treatment cartridge includes at least one laterally protruding part for support by a respective support surface of the device.

This allows the liquid treatment cartridge to be suspended from the head part in the operational position of the liquid treatment cartridge. There need be no support surface under the liquid treatment cartridge. This can be desirable where the head part is suitable for use with liquid treatment cartridges of different lengths, for example. It also allows for easy replacement of the liquid treatment cartridge even if the head part is fixed, for example fixed to a wall.

In a variant of this embodiment, at least a section of the at least one laterally protruding parts arranged to contact the support surface is rounded.

In this embodiment, the cartridge can be supported by a main part of the device in the head part and the connecting head arranged to be inserted into a receiving part journalled for movement with respect to the main part whilst the connecting head is inserted. The main part supports the cartridge during this movement without this arrangement causing a large amount of resistance to movement.

In an embodiment of the liquid treatment apparatus, the liquid treatment cartridge:
  is provided with at least three cartridge ports in liquid communication with an interior of the liquid treatment cartridge, of which at least two are provided in the connecting head,
  includes at least one certain liquid treatment part, and
  is arranged to conduct liquid conducted through a first of the two cartridge ports through the certain liquid treatment part and liquid conducted through a second of the two cartridge ports along a flow path through the liquid treatment cartridge that bypasses at least part of the certain liquid treatment part.

This is thus a liquid treatment cartridge with an internal bypass, suitable for providing a mix of liquids treated differently or to a different extent, wherein the ratio of the constituents of the mix is determined by the setting of the ratio-setting valve.

In a particular variant, the at least one certain liquid treatment part includes a liquid treatment medium for the treatment of aqueous liquids by ion exchange, e.g. at least one type of cation exchange resin, for example at least cation exchange resin in the hydrogen form.

This allows the apparatus to provide a mix of liquids, e.g. aqueous liquids, of which the constituents have been treated differently or to a different extent by ion exchange. The concentration of e.g. hardness-inducing minerals, the acidity or the alkalinity of the mix can be set to a value determined by the settings of the ratio-setting valve.

BRIEF DESCRIPTION OF THE DRAWINGS

The invention will be explained in further detail with reference to the accompanying drawings, in which.

DETAILED DESCRIPTION

Figure 1:
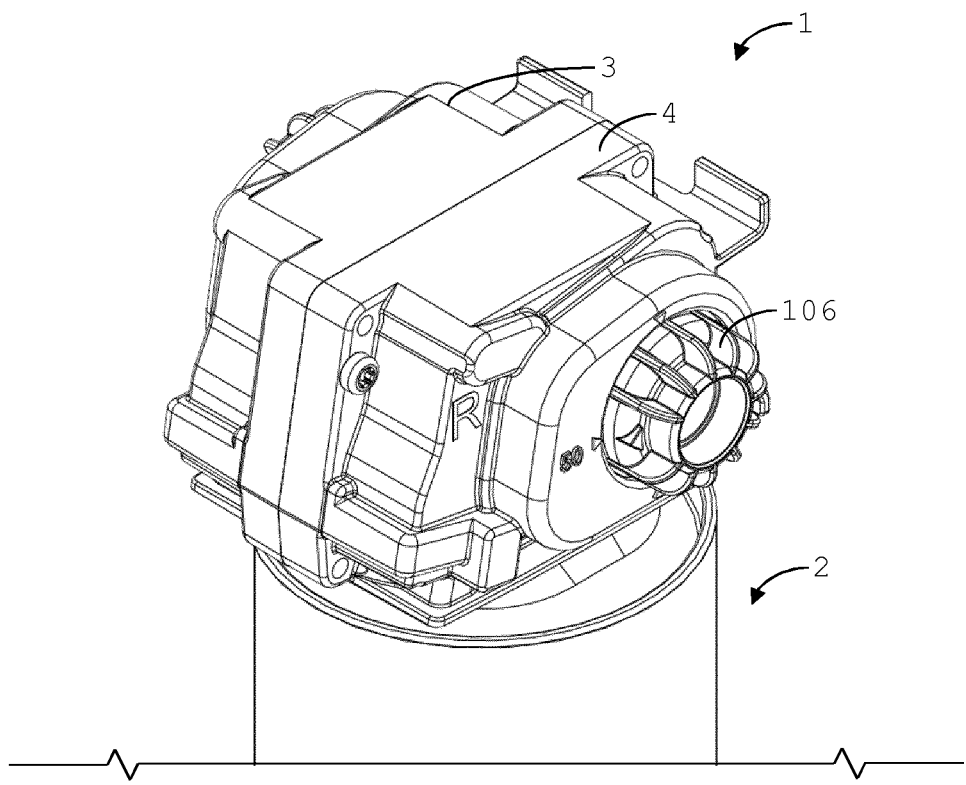
FIG. 1 is a perspective view of a liquid treatment apparatus including a head part and a replaceable liquid treatment cartridge.
Figure 2:
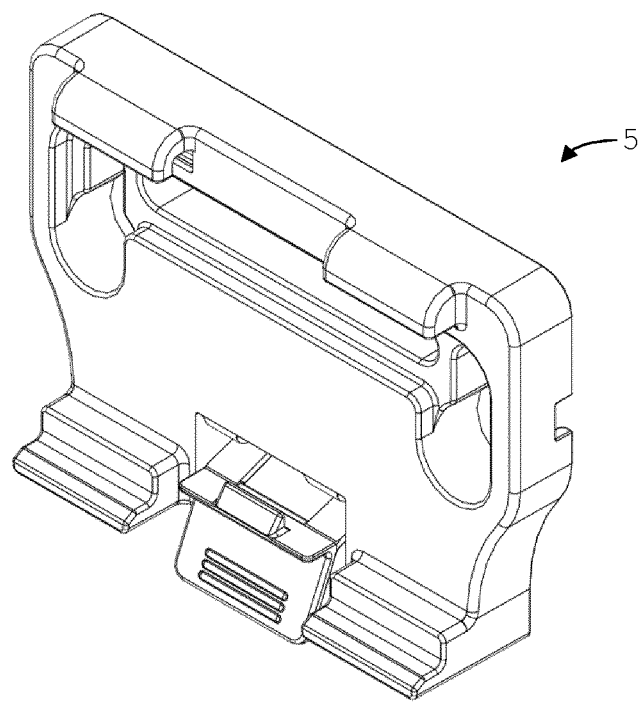
FIG. 2 is a perspective view of a mounting plate for the head part.
Figure 3:
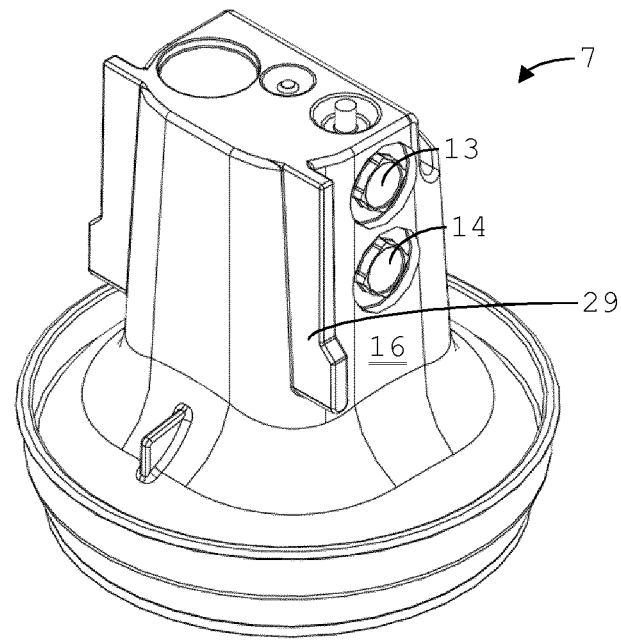
FIG. 3 is a perspective view of a cap-shaped part of the liquid-treatment cartridge.
Figure 4:
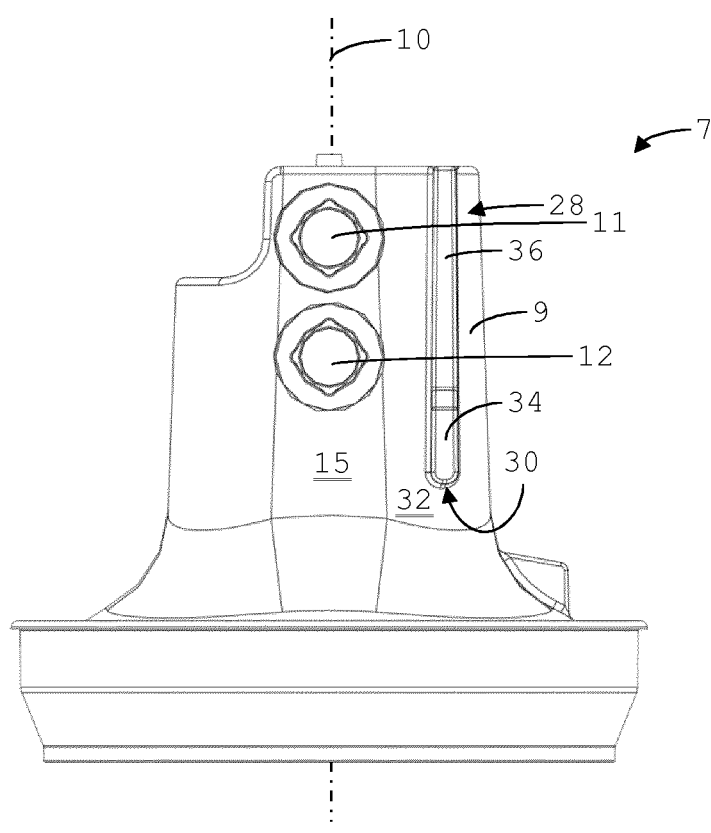
FIG. 4 is a first side view of the cap-shaped part of FIG. 2.
Figure 5:
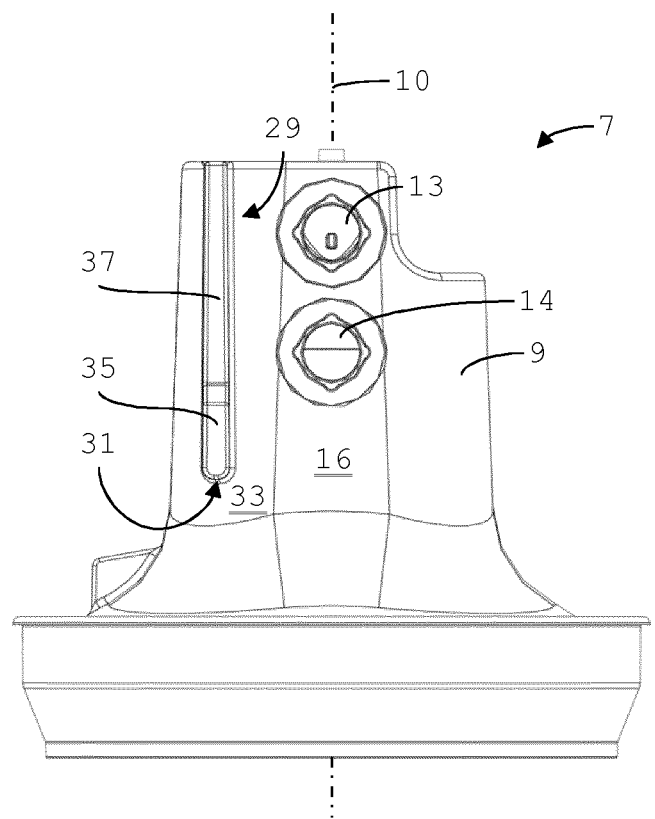
FIG. 5 is a second side view of the cap-shaped part of FIGS. 2 and 3.

In the following, a liquid treatment apparatus (FIG. 1) for the treatment of aqueous liquids such as drinking water will be described. The liquid treatment apparatus includes a head part 1 and a replaceable liquid treatment cartridge 2. The head part 1 in this embodiment is for receiving a single liquid treatment cartridge 2. In another embodiment, it may be a multi-head device for receiving a number of liquid treatment cartridges. The head part 1 includes a housing comprising left and right housing parts 3,4 joined together to form a housing. A mounting plate 5 (FIG. 2) allows the head part 1 to be mounted to a wall. The housing formed by the left and right housing parts 3,4 is also referred to as the main part of the head part herein. A receiving part 6 is movably journalled within the housing of the head part 1.

The liquid treatment cartridge 2 is of the type described more fully in international patent application No. PCT/EP2015/050155 of 7 Jan. 2015, the contents of which are hereby incorporated by reference. It has a housing formed by a cap-shaped part 7 (FIGS. 3-6) and a vessel 8 (FIG. 7), closed at one end by the cap-shaped part 7.

The cap-shaped part 7 includes an integral connecting head 9. The connecting head 9 is insertable into a cavity of the receiving part 6 in a first position of the receiving part 6 with respect to the housing of the head part 1.

A reference axis (FIGS. 4 and 5) referred to herein as cartridge axis 10 is an axis extending from a closed end of the vessel 8 to the end of the cartridge 2 at which the connecting head 9 is provided. In the illustrated embodiment, the cartridge 2 has an elongated shape and the cartridge axis 10 corresponds to a longitudinal axis of the cartridge 2.

The connecting head 9 is provided with four cartridge ports 11-14 in liquid communication with an interior of the cartridge 2. First and second ports 11,12 are provided in a first surface section 15 (FIG. 4) facing in a direction at an angle to the cartridge axis 10 such that the connecting head 9 tapers towards the axial end of the cartridge 2 at which the connecting head 9 is provided. Third and fourth cartridge ports 13,14 are provided in a second surface section 16 (FIG. 5) facing at an angle to the cartridge axis 10 such that the connecting head 9 tapers towards the axial end of the cartridge 2 at which the connecting head 9 is provided. The angle is larger than 45°, but smaller than 90° to achieve the taper. The first and second surface sections 15,16 face in directions of which the lateral components (with respect to the cartridge axis 2 are oppositely directed. There is thus a pair of cartridge ports 11-14 on each of opposite sides of the connecting head 9. One of the pairs is arranged to function as inlets for liquid and the other of the pairs is arranged to function as outlets for liquid. The first and second cartridge ports 11,12 are arranged in a row parallel to the cartridge axis 10, as are the third and fourth cartridge ports 13,14. Furthermore, the first cartridge port 11 is aligned with the third cartridge port 13 and the second cartridge port 12 is aligned with the fourth cartridge port. Exact alignment is not required, however. Grooves are provided for mounting sealing rings (not shown) around the cartridge ports 11-14. The first and second surface sections 15,16 are essentially planar, so that the sealing elements are compressed relatively uniformly when pressed against a co-operating surface to form seals around the cartridge ports 11-14. Due to the taper, the sealing elements are only compressed when the connecting head 9 is close to fully inserted into the cavity of the receiving part 6. This helps avoid wear or dislocation of the sealing elements during insertion.

Figure 6:
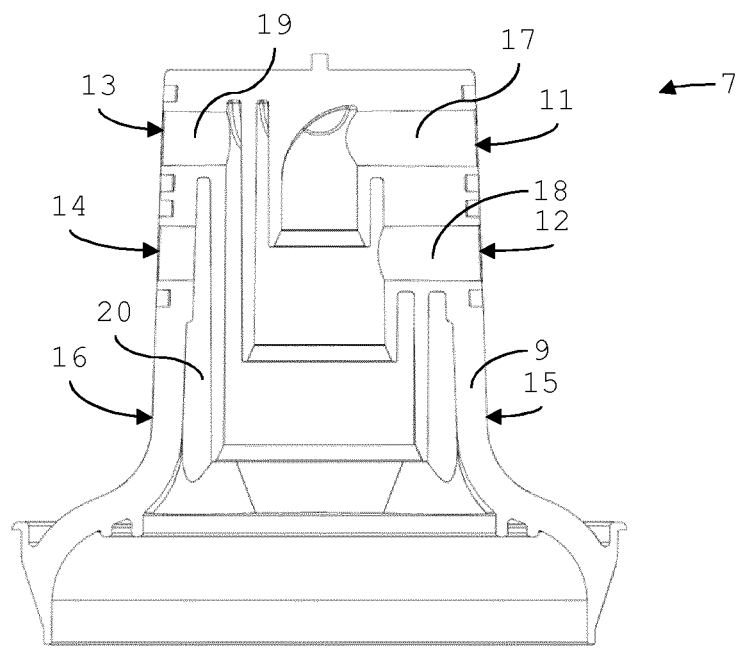
FIG. 6 is a cross-sectional view of the cap-shaped part of FIGS. 2-4.
Figure 7:
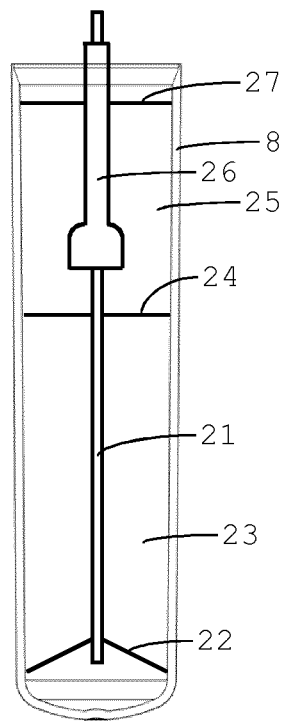
FIG. 7 is simplified cross-sectional view of a vessel-shaped part of the liquid treatment cartridge and flow conducting parts arranged therein.
Figure 8:
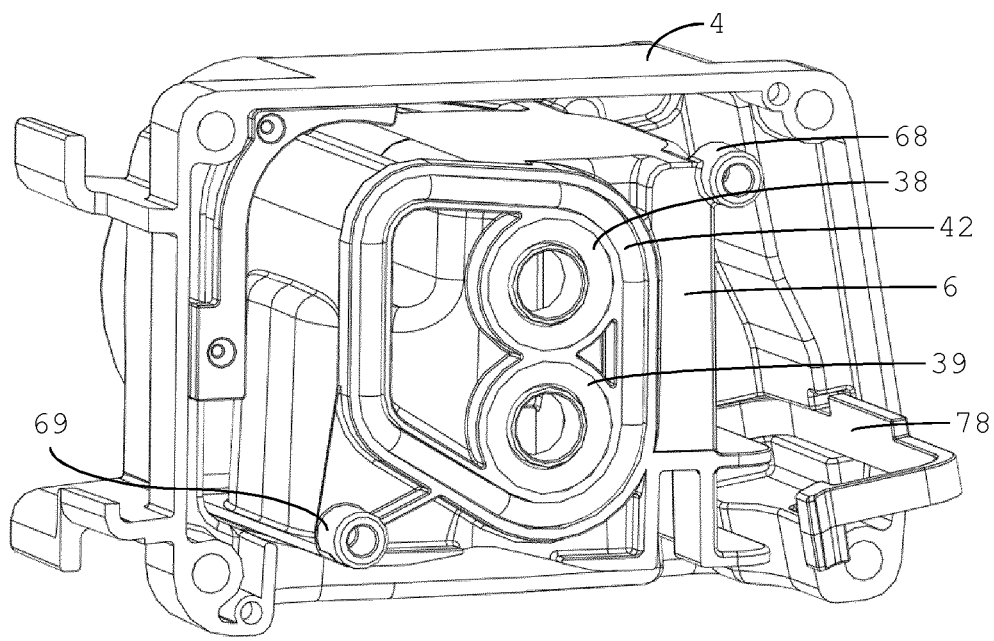
FIG. 8 is a perspective view of the interior of the head part of the liquid treatment apparatus in which a part of a housing of the head part has been omitted.
Figure 9:
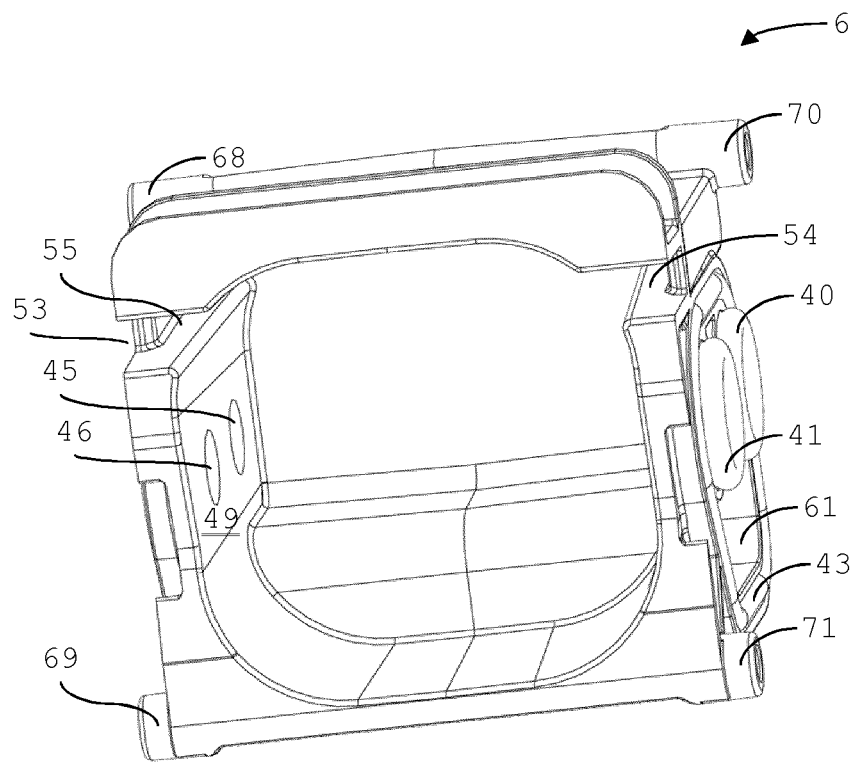
FIG. 9 is a first perspective view of an underside of a receiving part movably journalled in the housing.
Figure 10:
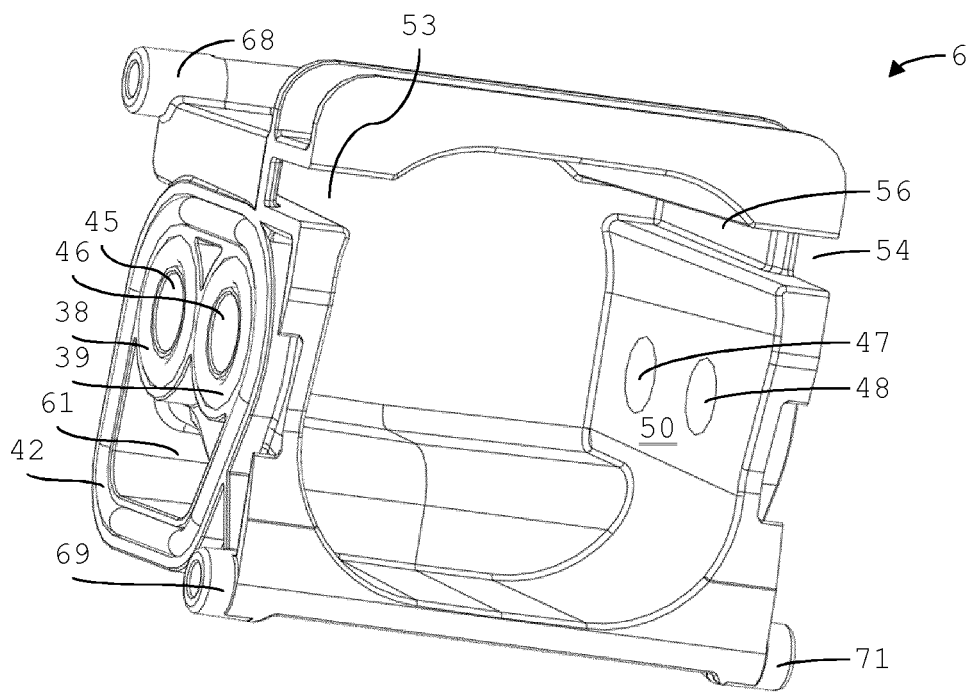
FIG. 10 is a second perspective view of the underside of the receiving part of FIG. 8.
Figure 11:
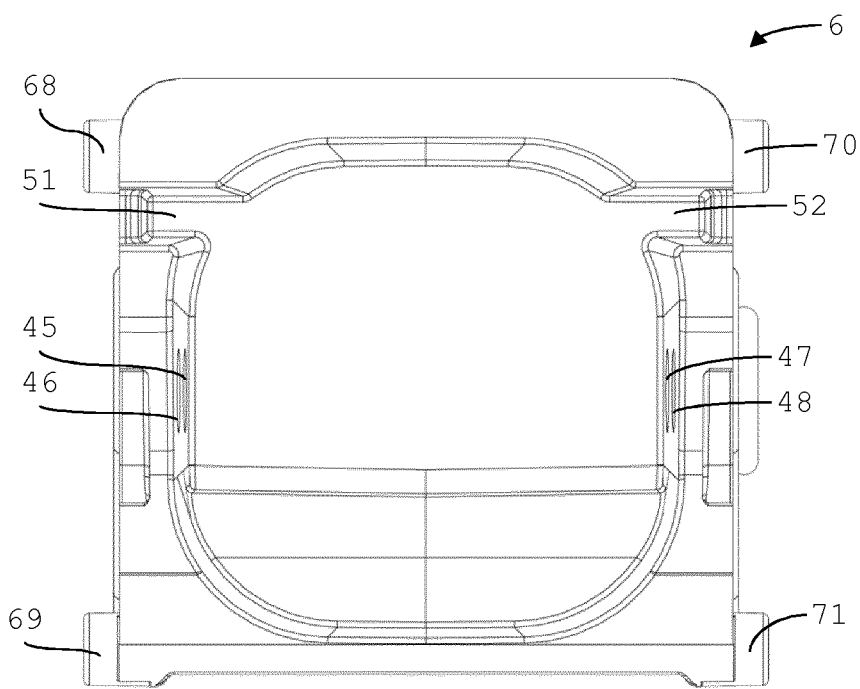
FIG. 11 is a bottom view of the receiving part of FIGS. 8-10.
Figure 12:
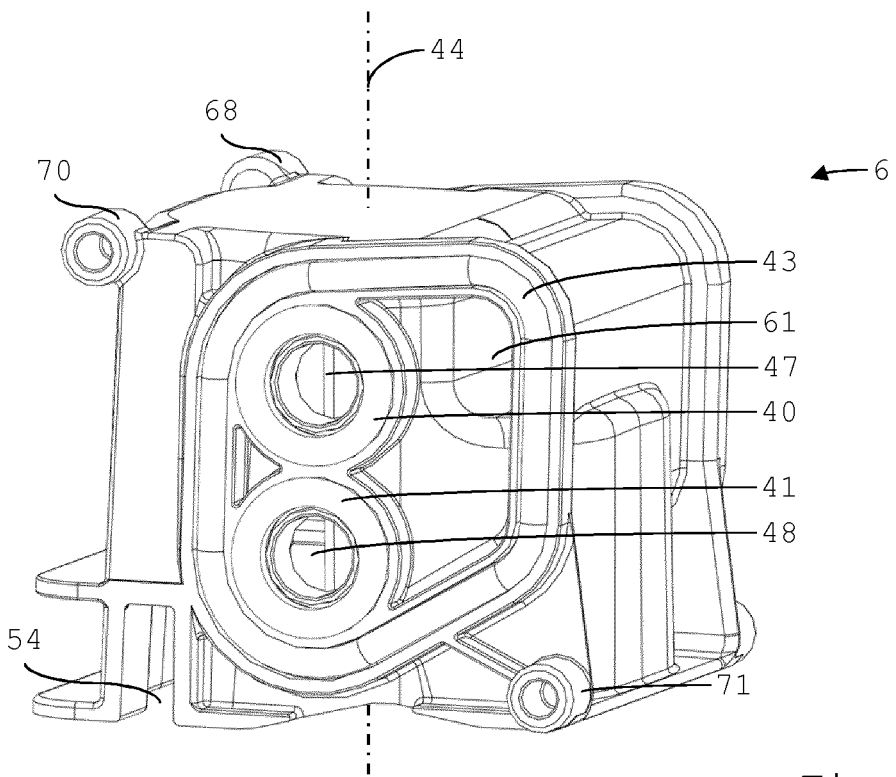
FIG. 12 is a perspective view of the receiving part from the side.
Figure 13:
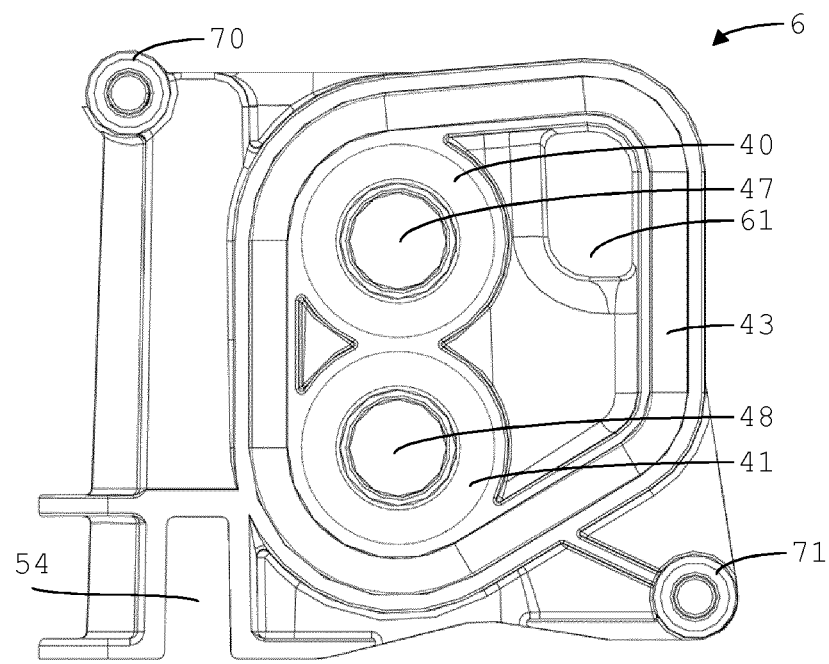
FIG. 13 is a plan side view of the receiving part.

The cartridge ports 11-14 are each provided at an end of a respective channel 17-20 through the connecting head 9 (FIG. 6). End sections of at least the central three channels 17-19 are arranged concentrically, centred on the cartridge axis 10. They are directed essentially axially into the interior of the cartridge housing. The ends of the first to third channels 17-19 each terminate at a different respective axial position, so that these interior ends are provide within at least one of the other channels 18-20. Liquid can mingle at these ends unless they are separated by separate flow conductor parts.

This is in fact the case for the example used herein, in which flow conductor parts are plugged into the ends of the first and second channels 17,18.

One of these is a fall tube 21 (FIG. 7) extending to close to an opposite axial end of the cartridge 2 in this example. It passes through a flow distributor device 22 arranged at that end. The flow distributor device 22 adjoins a first bed 23 of granular liquid treatment medium. The liquid treatment medium may in particular include ion exchange resin, for example cation exchange resin. A cation exchange resin with a relatively high volumetric capacity is weakly acidic cation exchange resin. Regardless of the type, at least initially, a majority of the cation exchange resin by number of functional groups per unit volume may be in the hydrogen form. This medium is suitable for reducing the carbonate hardness of water contacting it. A minority of the cation exchange resin may be loaded with an alkali metal, e.g. potassium or sodium, for buffering purposes. Other sorbents such as activated carbon may be included in the liquid treatment medium of the first bed 23. A liquid-permeable divider part 24 separates the first bed 23 from a second bed 25 of granular liquid treatment medium differing in composition from the first bed 23. In an example, the second bed 25 includes only liquid treatment media other than liquid treatment media for the treatment of liquid by ion exchange, e.g. sorbents such as activated carbon. In another example, it includes only liquid treatment media other than cation exchange material, e.g. at least an anion resin. A concentric flow conductor 26 is arranged around an axial section of the fall tube 21 proximal to the connecting head 9 and plugged into an end section of the second channel 18. Its other end terminates in the second bed 25. Thus, liquid entering the cartridge 2 through the second cartridge port 12 bypasses the first bed 23, whereas liquid entering through the first cartridge port 11 is conducted through the first bed 23. The two flows mix in the second bed 25. The mix of liquid can leave the cartridge through the third and the fourth cartridge ports 13,14 simultaneously. A liquid-permeable screen 27 retains the material of the second bed 25.

The volumetric flow rate ratio of the flows of liquid entering the cartridge through the first cartridge port 11,12 can be set by means of a ratio-setting valve in the head part 1, as will be explained further below.

Returning to the exterior of the connecting head 9 (FIGS. 3-5), first and second alignment ridges 28,29 are provided adjacent the first and second cartridge ports 11,12 and adjacent the third and fourth cartridge ports 13,14 respectively. The alignment ridges 28,29 extend in a direction essentially parallel to the cartridge axis 10. Axial ends 30,31 distal to the axial end of the cartridge 2 at which the connecting head 9 is provided are rounded.

The alignment ridges 28,29 are provided on curved surface sections 32,33 in this example. These surface sections 32,33 face in directions at an angle to the cartridge axis 10 such that the connecting head 9 tapers in axial direction towards the axial end of the cartridge 2 at which the connecting head 9 is provided. Each of the alignment ridges 28,29 has a first section 34,35 extending to the end distal to the axial end of the cartridge 2 at which the connecting head 9 is provided. Each of the alignment ridges 28,29 has a second section 36,37 extending to the end proximal to the axial end of the cartridge 2 at which the connecting head 9 is provided. There is a stepped transition between the first and second sections 34-37. The stepped transition is such that the elevation with respect to the curved surface section 32,33 decreases stepwise from the first section 34,35 to the second section 36,37. Furthermore, the elevation of the second section 36,37 with respect to the curved surface section 32,33 on which it is provided increases in axial direction towards the axial end of the cartridge 2 at which the connecting head 9 is provided. This compensates for the taper of the connecting head 9. It is noted that, although the curved surface sections 32,33 do not face in exactly opposite directions, due to their curvature, the alignment ridges 28,29 do protrude in opposite directions. These directions are perpendicular to a reference plane in which the cartridge axis 10 lies, which plane is parallel to or contains a locus of movement of the connecting head 9 whilst inserted into the receiving part 6. This aids in converting a force exerted by an operator on the cartridge 2 into movement of the cartridge 2 and the receiving part 6.

The receiving part 6 (FIGS. 8-13) includes a body and, in this example, first to sixth sealing elements 38-43. The body defines the cavity for receiving the connecting head 9. The cavity has a shape corresponding to that of the connecting head 9. It thus tapers in axial direction towards the end distal to the mouth of the cavity.

It is possible to define a reference axis 44 (FIG. 12) aligned with the cartridge axis 10 when the connecting head 9 is inserted into the cavity. This reference axis 44 is thus essentially perpendicular to the mouth of the cavity. The reference axis 44 lies in a plane of movement of the receiving part 6 between a first and a second position with respect to the housing formed by the housing parts 3,4.

Liquid-permeable ports 45-48 are provided in and through opposing first and second receiving part side wall sections 49,50. First and second ports 45,46 are provided in a first side wall section 49. Third and fourth ports 47,48 are provided in a second side wall section 50. Each of the side wall sections 49,50 is at an angle to the reference axis 44 such that the cavity tapers towards the end distal to the mouth.

In the illustrated example, each of the side wall sections 49,50 is essentially planar to allow it to compress the sealing elements provided around the cartridge ports 11-14.

When the connecting head 9 is fully inserted into the cavity, each of the cartridge ports 11-14 is in direct, sealed liquid communication with one of the receiving part ports 45-48. The seals isolate the flows of liquid through the cartridge ports 11-14 and the receiving part ports 45-48 from each other as well as from the cavity.

Alignment grooves 51,52 (FIGS. 9-11) are at least open to the cavity and in this example also at axial ends adjacent a mouth of the cavity. These alignment grooves 51,52 are for receiving the first and second alignment ridges 28,29 on the connecting head 9 of the cartridge 2. They are on opposite sides of the cavity, facing each other. First (lower) sections 53,54 extend through the side wall sections of the receiving part 6 in which they are provided to form slits through these side wall sections. These sections 53,54 are provided at axial ends proximal to the mouth of the cavity. Second (upper) alignment groove sections 55,56 are shaped as slots. The depth of each of the second alignment groove sections 55,56 increases in axial direction towards the end of the cavity distal to the mouth of the cavity, thus compensating for the taper of the cavity. The first alignment ridge sections 34,35 have an elevation relative to the curved surface sections 32,33 from which they protrude that exceeds the thickness of the wall where the first alignment groove sections 53,54 are provided, in this example. The axial, in this example rounded, ends 30,31 of the alignment ridges 28,29 also protrude from the axial ends of the grooves 51,52 when the connecting head 9 is fully inserted into the cavity. This allows them to contact support surfaces 57,58 defined by ledges 59,60 on the insides of the left and right housing parts 3,4 in the second position and whilst the receiving part 6 moves from the first into the second position.

The receiving part ports 45-48, since they pass through a side wall section 49,50 of the receiving part 6, are also externally accessible. This allows them to form part of a valve mechanism similar to a sliding gate valve mechanism, of which the receiving part 6 forms the movable valve member.

First to fourth receiving part sealing elements 38-41 each surround one of the receiving part ports 45-48 on the outside (FIGS. 9, 10, 12 and 13). The fifth and sixth receiving part sealing elements 42,43 surround the first and second receiving part ports 45,46 and the third and fourth receiving part ports 47,48, respectively. They also each surround one of opposite openings of a bypass channel 61 extending through the body of the receiving part 6. The bypass channel 61 thus extends from a side of the receiving part 6 on which ports functioning as inlet openings are provided to a side of the receiving part 6 on which ports functioning as outlet openings are provided. These are opposite sides with respect to a central plane of movement of the receiving part 6 between the first and second positions with respect to the main part of the head part 1.

Figure 15:
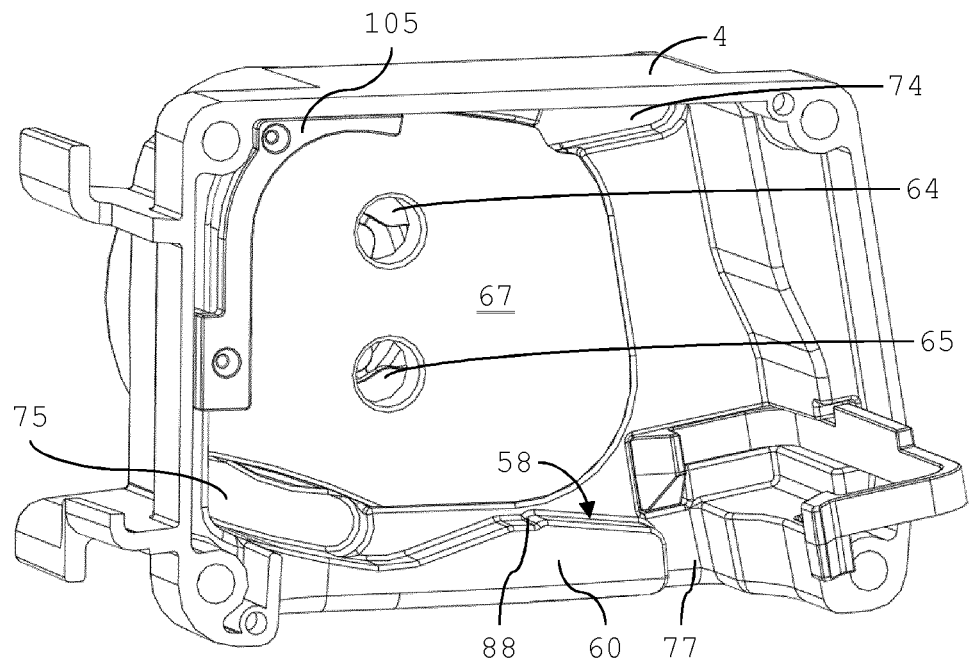
FIG. 15 is a perspective view of the interior of the head part with the receiving part and part of the housing of the head part omitted.
Figure 16:
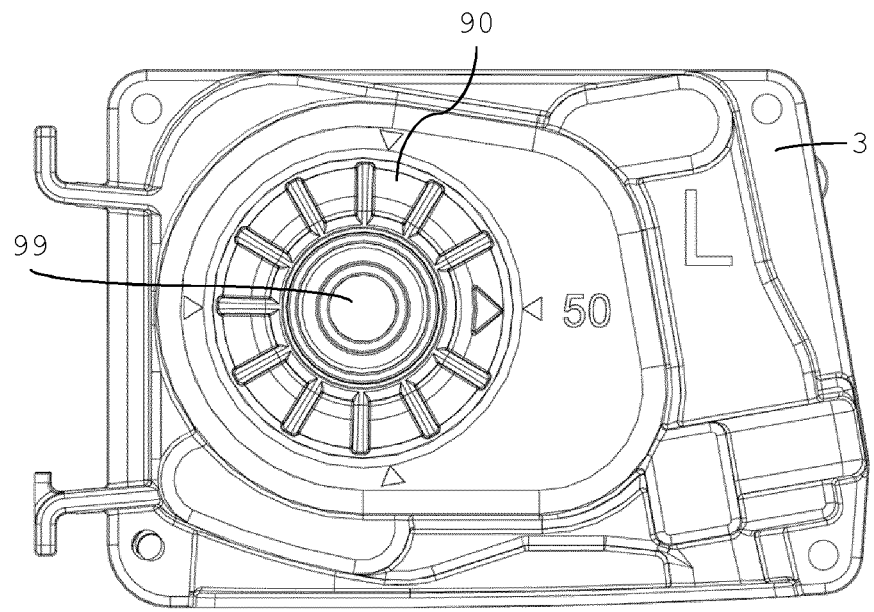
FIG. 16 is side view of a left part of the housing.
Figure 17:
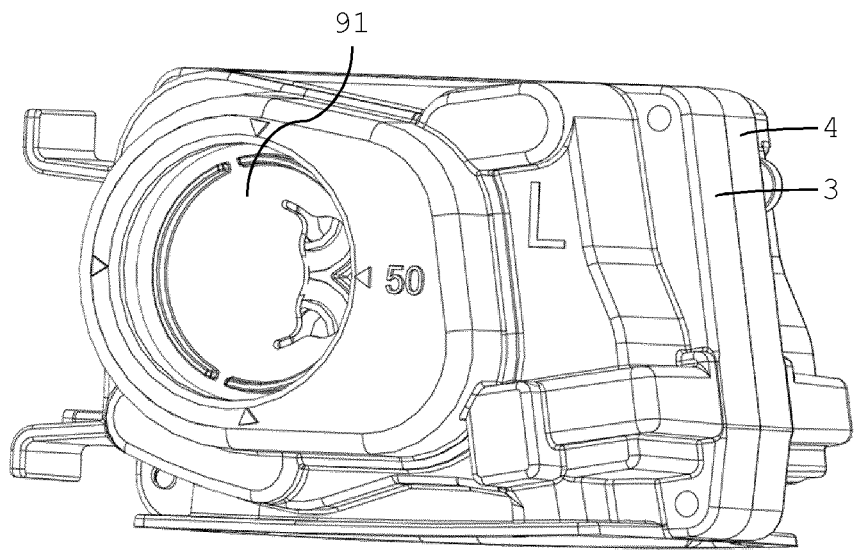
FIG. 17 is a perspective view of the housing with an operating part of a ratio-setting valve omitted.
Figure 18:
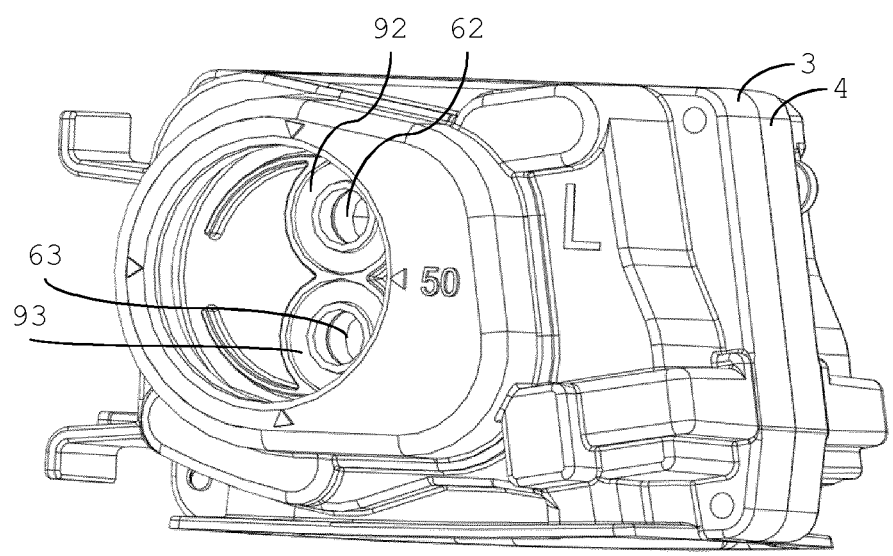
FIG. 18 is a second perspective view of the housing, with the operating part and a regulating part of the ratio-setting valve omitted.
Figure 22:
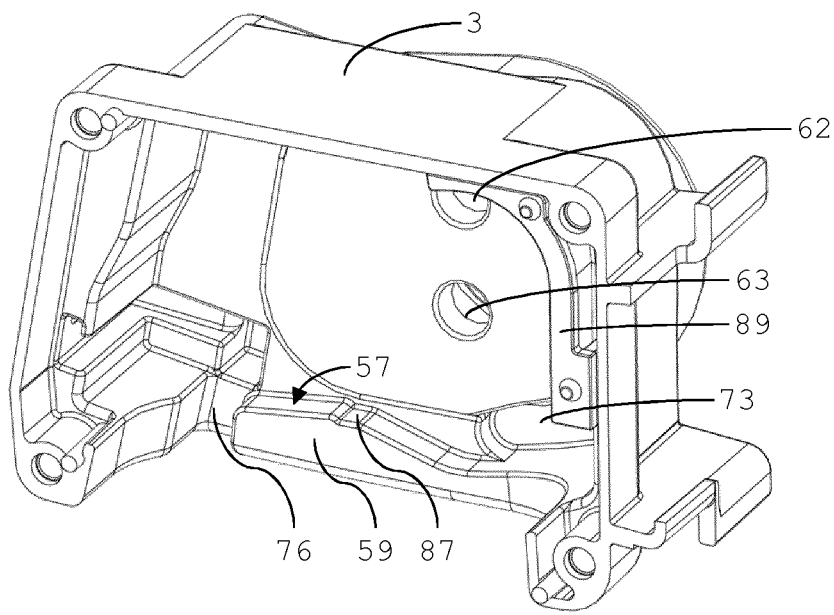
FIG. 22 is a perspective view of the inside of the left housing part with a screening part mounted thereto.
Figure 33:
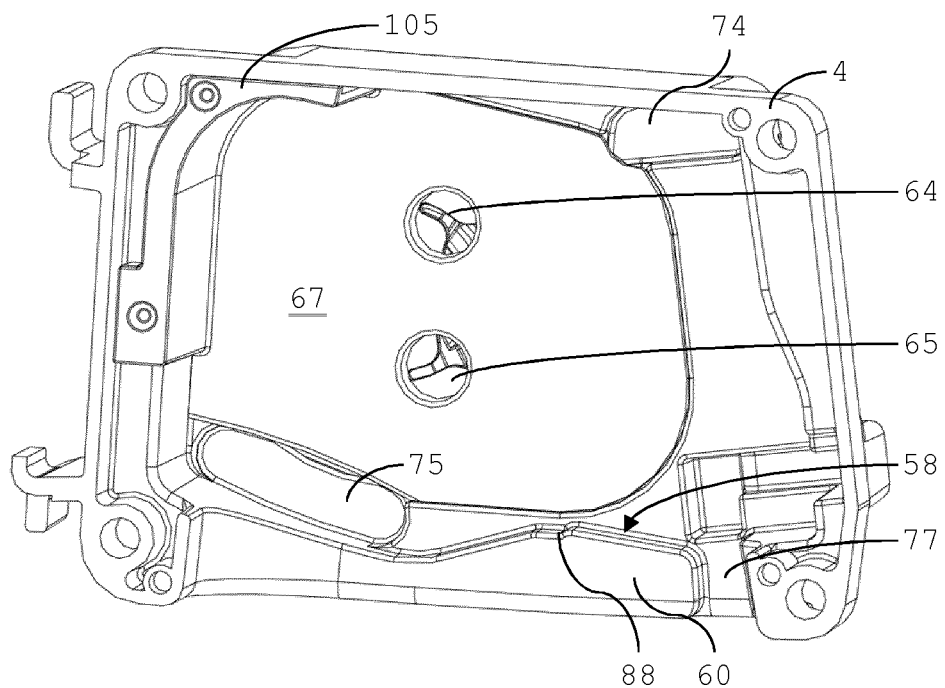
FIG. 33 is a perspective view of an inside of the right housing part with a screening part mounted thereto.
Figure 34:
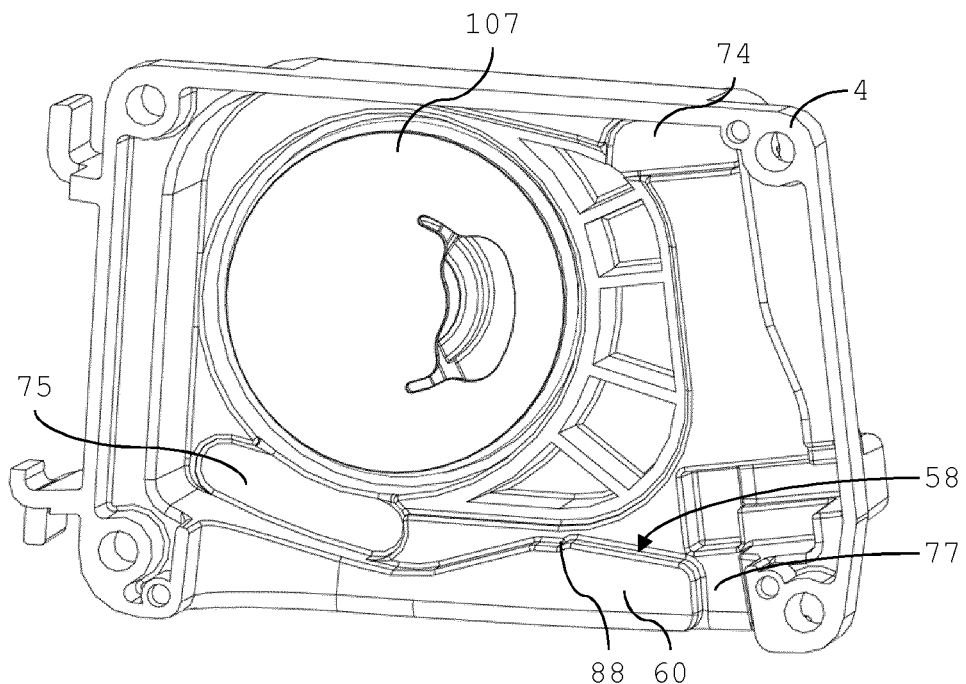
FIG. 34 is a perspective view corresponding to that of FIG. 33, but with the screening part omitted to show a movable regulating part of a ratio-setting valve.
Figure 35:
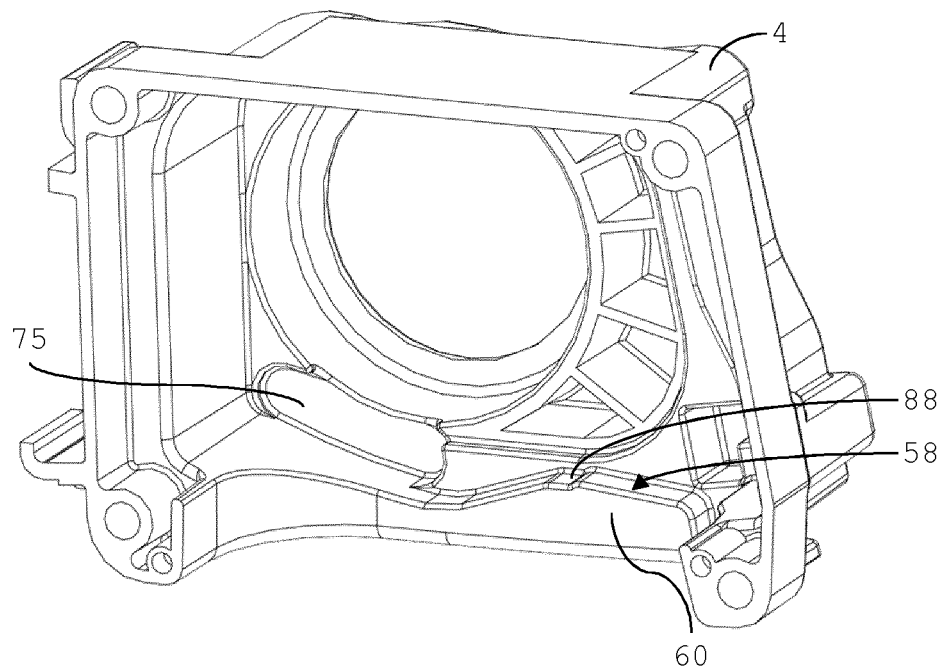
FIG. 35 is a perspective view corresponding to that of FIG. 34, but with the ratio-setting valve omitted.
Figure 36:
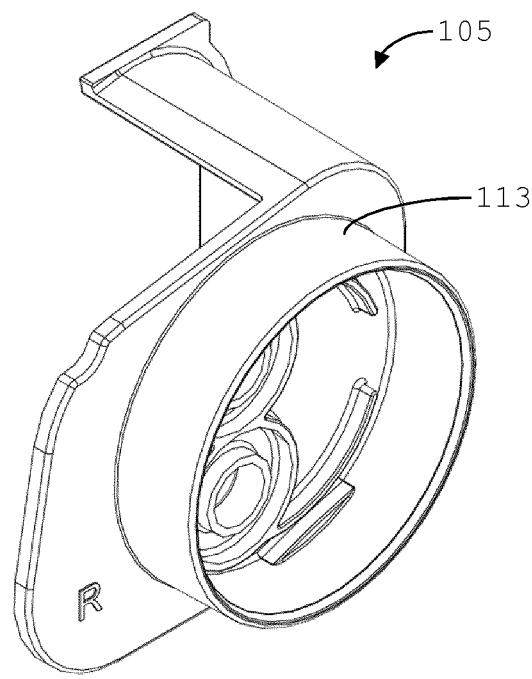
FIG. 36 is a first perspective view of the screening part of FIG. 33.
Figure 37:
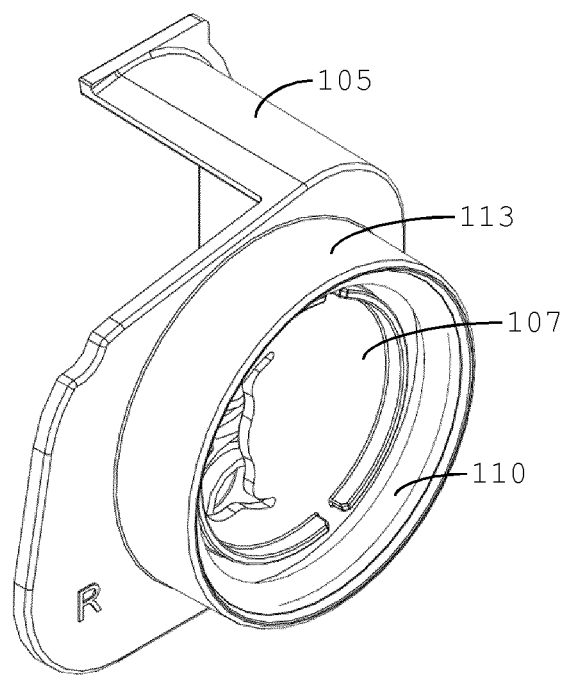
FIG. 37 is a second perspective view of the screening part of FIGS. 33 and 36.
Figure 38:
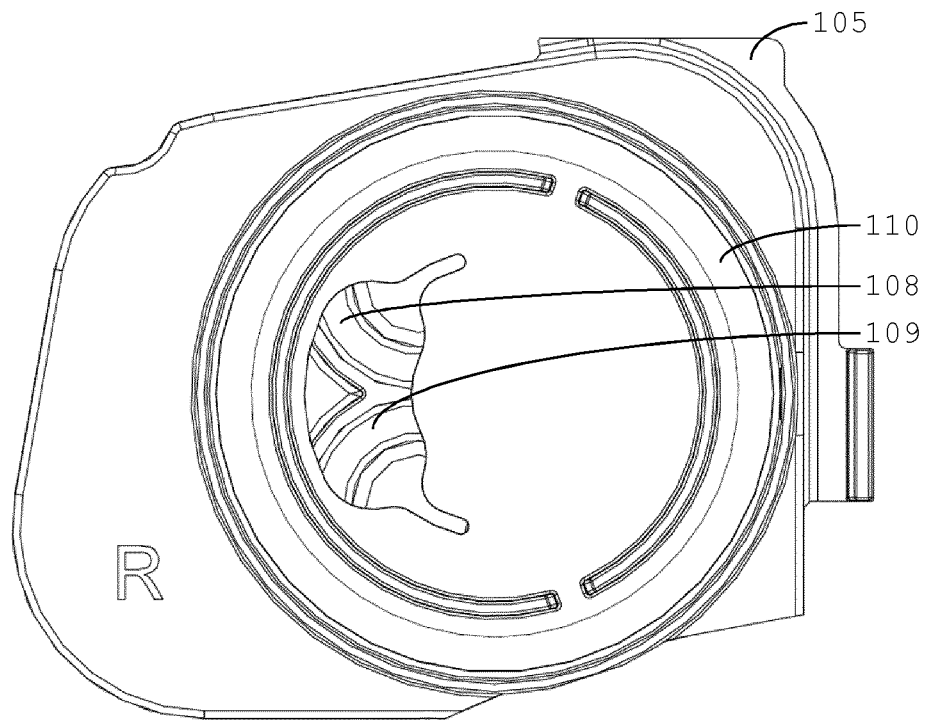
FIG. 38 is a plan view of the screening part of FIGS. 33 and 36-37, with parts of the ratio-setting valve in place.

The main part of the head part 1 has first ports 62-65 of ratio-setting valves defined therein (FIGS. 15, 22 and 33). These first ports 62-65 are also part of the valve mechanism comprising the receiving part 6, since they are aligned with the receiving part ports 45-48 and in direct, sealed liquid communication with them in the second position of the receiving part. The fifth and sixth receiving part sealing elements 42,43 surround these first ports 62-65 in the first, the second and all intermediate positions, so that liquid cannot leak out between the receiving part and the housing parts 3,4. This also ensures that liquid can pass from the first ports 62,63 on one side of the receiving part 6 to the first ports 64,65 on the opposite side of the receiving part 6 when the receiving part ports 45-48 are not in complete alignment with the first ports 62-65, i.e. in positions other than the second position, especially in the first position.

It is noted that the first ports 62-65 are provided in wall sections having an essentially planar surface 66,67 facing the receiving part 6. This allows for uniform compression of the receiving part sealing elements 38-41 at each position between the first and second positions, given that movement between the first and second positions is along a locus in a plane parallel to the planar surfaces 66,67.

The receiving part 6 is journalled for movement between the first and second positions by way of guide protrusions 68-71 on the receiving part 6 and guides 72-75 defined on the inside of the left and right housing parts 3,4 for receiving the guide protrusions 68-71. The movement is a combination of a displacement of the receiving part 6 and an internal rotation, so that the cartridge 2 swivels and is displaced, e.g. in a direction to and from a wall on which the head part 1 is mounted. During this movement, the support surfaces 57,58 support the cartridge 2 by the rounded ends 30,31.

The ledges 59,60 prevent retraction of the connecting head 9 in the second position and all other positions leading up to the first position. This is because they obstruct the first sections 34,35 of the alignment ridges 28,29. Gaps 76,77 adjacent the ledges 59,60 (FIGS. 20-22, 33 and 34) are aligned with the alignment grooves 51,52 in the first position to allow the connecting head 9 to be inserted and retracted in that position.

Figure 14:
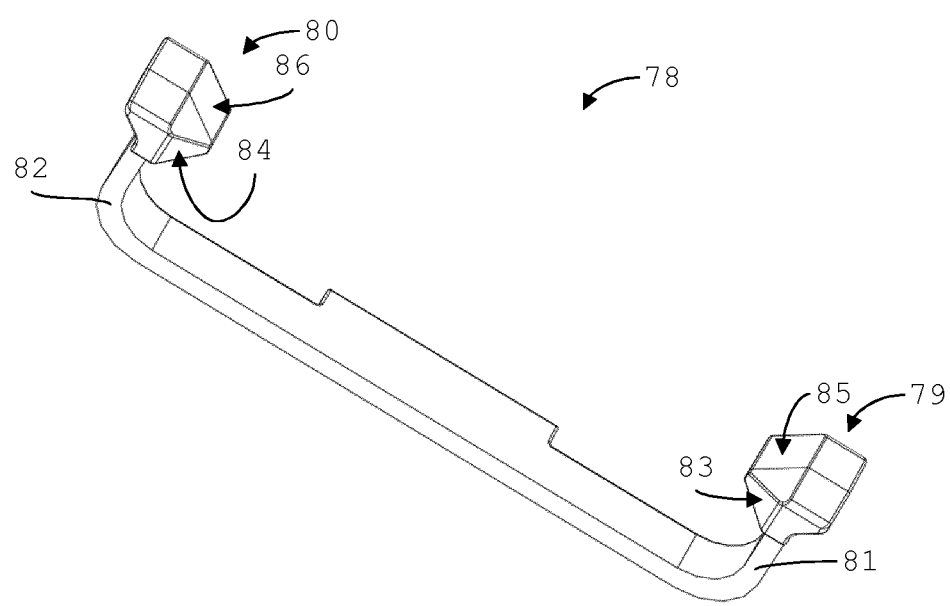
FIG. 14 is a perspective view of a latching device arranged inside the housing of the head part to hold the receiving part in a first of first and second positions.

This position of the receiving part 6 should be retained after a connecting head 9 has been retracted to allow the connecting head 9 of a replacement cartridge 2 to be inserted and also to keep the ends of the bypass channel 61 in full alignment with the first ports 62-65. To this end, a latching device 78 (FIG. 14) is provided.

In the illustrated embodiment, the latching device 78 is a single resilient, essentially U-shaped insert having pawls 79,80 at respective free ends of its arms 81,82. Part of the receiving part 6 is received between the arms 81,82 in the first position. In that position, the pawls 79,80 engage the first sections 53,54 of the alignment grooves 51,52 when not occupied by the first alignment ridge sections 34,35.

When the receiving part 6 is moved into the first position, it forces the arms 81,82 apart. When the cartridge 2 is then retracted, the pawls 79,80 snap into place. When the connecting head 9 of the replacement cartridge 2 is inserted into the cavity of the receiving part 6, the first alignment ridge sections 34,35 urge the pawls 79,80 out of the slits formed by the first alignment groove sections 53,54. This releases the receiving part 6, which can then be moved out of the first position towards the second position. Because the first alignment ridge sections 34,35 engage the pawls 79,80 and there is a stepped transition between the first sections 34,35 and the second sections 36,37, the receiving part 6 is only released when the connecting head 9 has been fully inserted and is also able to clear the ledges 59,60.

To ease the engagement, the pawls 79,80 are provided with facets 83-86. Downwardly directed facets 83,84 are for engaging the first alignment ridge sections 34,35. They face in part in a direction opposite to the direction of insertion of the connecting head 9 and in part towards each other. Facets 85,86 for engaging the receiving part face in part in a direction of movement of the receiving part 6 out of the first position and in part towards each other. Surfaces on an opposite side of the pawls 79,80 to the facets 85,86 that engage the receiving part 6 are essentially at right angles to the adjacent arm sections to provide a relatively strong shape-lock in co-operation with the first groove sections 53,54. Thus, the receiving part 6 is held in the first position.

A means of retaining the receiving part 6 in the second position and of signalling that the second position has been reached is also provided. This means comprises detents 87,88 (FIGS. 15,20-22, 33-34) in the support surfaces 57,58.

The ends 30,31 of the alignment ridges 28,29 supported by the support surfaces 57,58 engage the detents 87,88 in the second position. The weight of the cartridge 2 holds the ends 30,31 in the detents 87,88. They are lifted out when the user pulls on the cartridge 2.

It will be clear from the above description that the first ports 62-65 are placeable in sealed liquid communication with the cartridge ports 11-14 by placing the receiving part 6 with the inserted connecting head 9 in the second position. The valve mechanism comprising the receiving part 6 is then in an open configuration. Left and right ratio-setting valves can still be placed in a closed configuration in the second position in order to interrupt the flow of liquid from and to the cartridge 2.

A left ratio-setting valve includes a left screening part 89, a left operating part 90, a left movable regulating part 91 and left valve sealing elements 92-94.

Figure 19:
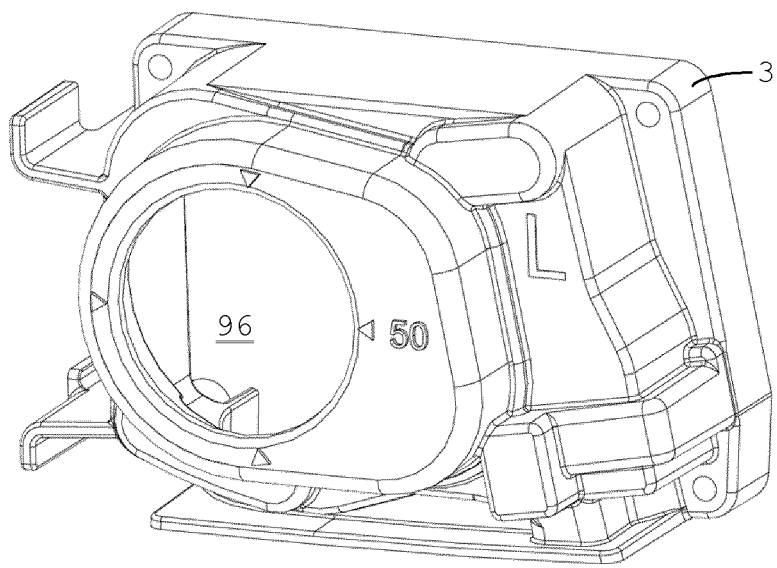
FIG. 19 is a perspective view of only the left housing part.
Figure 20:
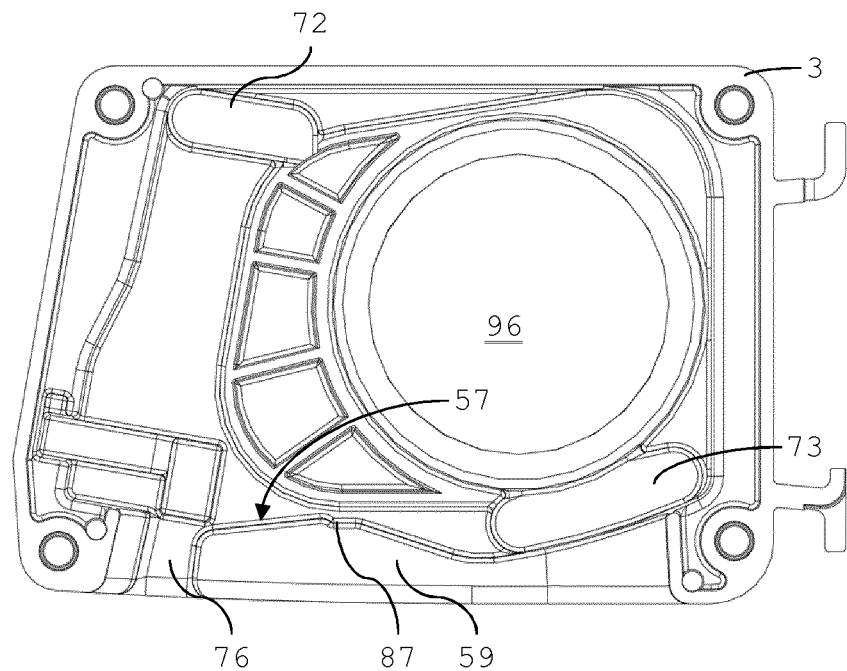
FIG. 20 is a plan side view of an inside of the left housing part.
Figure 21:
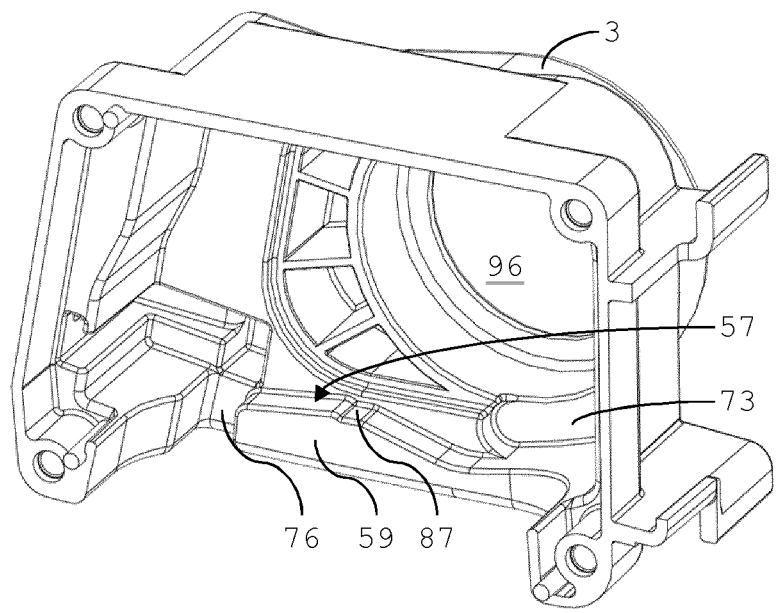
FIG. 21 is a perspective view of the inside of the left housing part.
Figure 23:
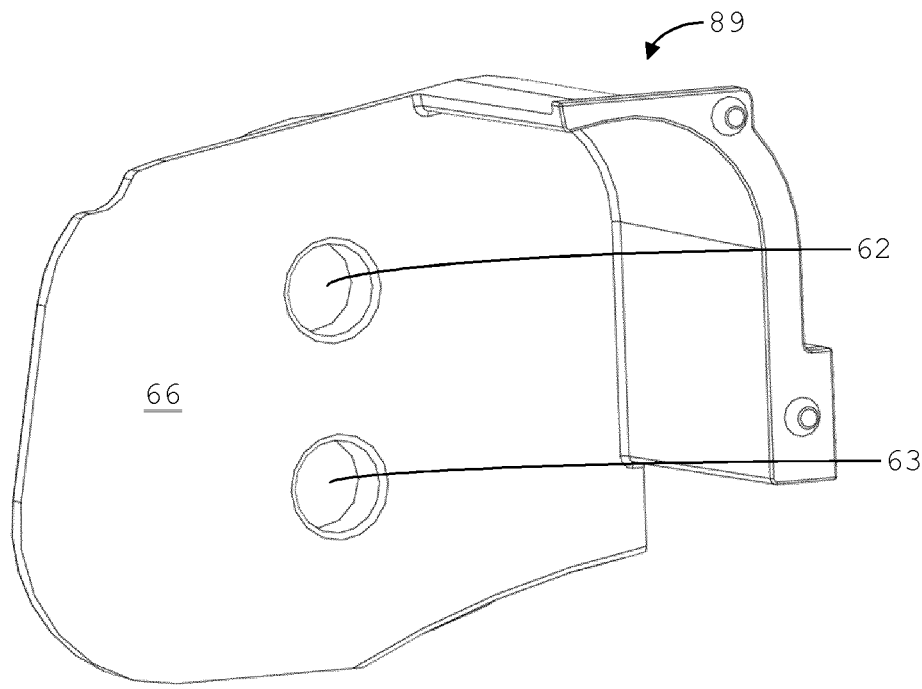
FIG. 23 is a first perspective view of the screening part.
Figure 24:
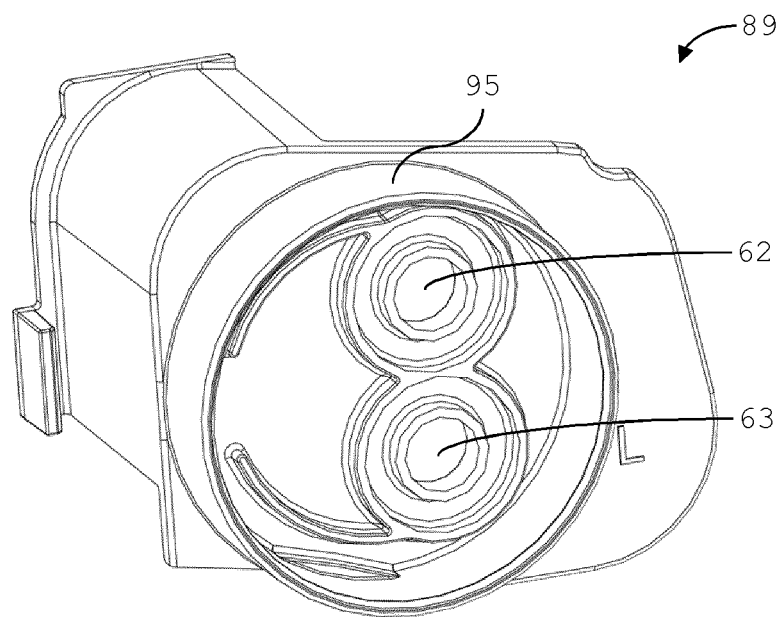
FIG. 24 is a second perspective view of the screening part.
Figure 25:
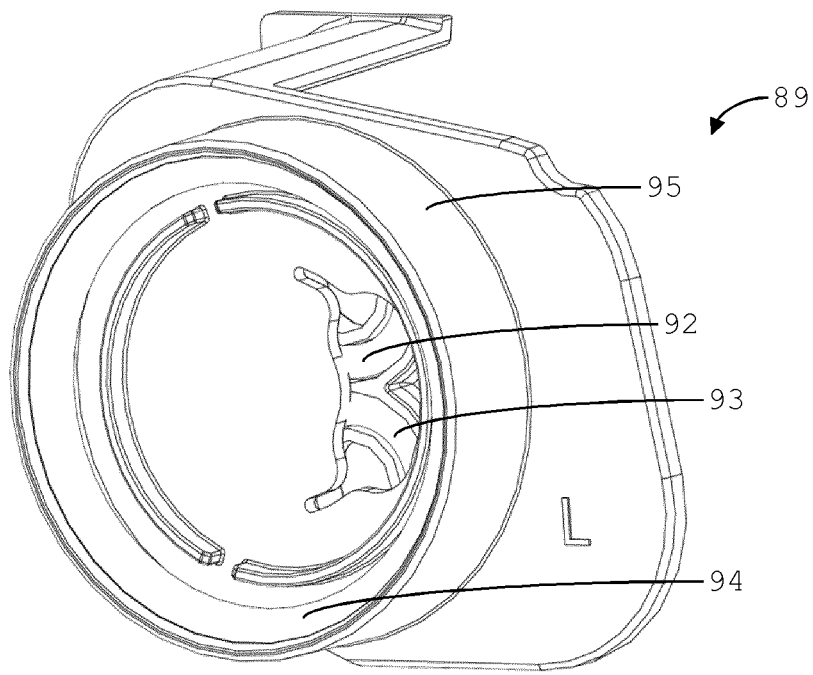
FIG. 25 is a thirds perspective view of the screening part with a movable regulating part of a ratio-setting valve in place.

The first ports 62,63 of the left ratio-setting valve are defined in a valve housing part 95 integral to the left screening part 89 (FIGS. 23-25), which is inserted through a left housing part aperture 96 (FIGS. 19-21) such that the latter is closed except for the first ports 62,63. In fact, the left screening part 89 lines a significant part of a side wall of the housing cavity in which the receiving part 6 is arranged to move between the first and second position, in this embodiment. This need not be the case in all embodiments.

Figure 29:
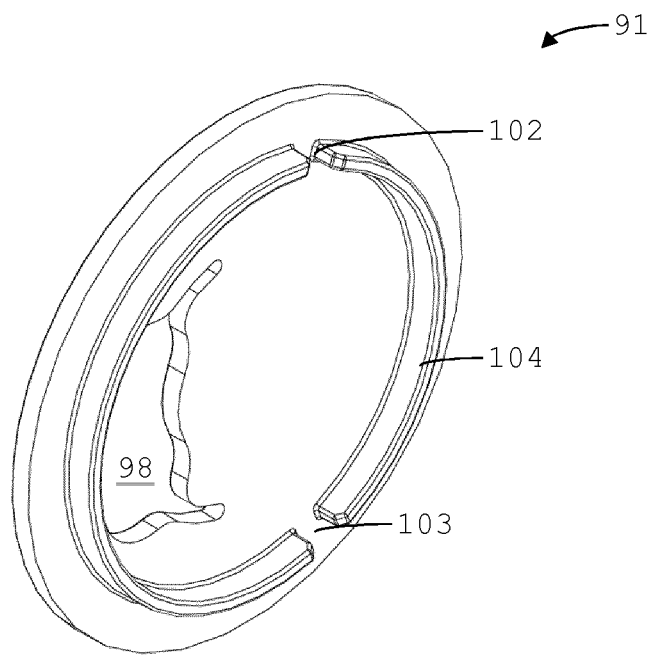
FIG. 29 is a first perspective view of a movable regulating part of the ratio-setting valve.
Figure 30:
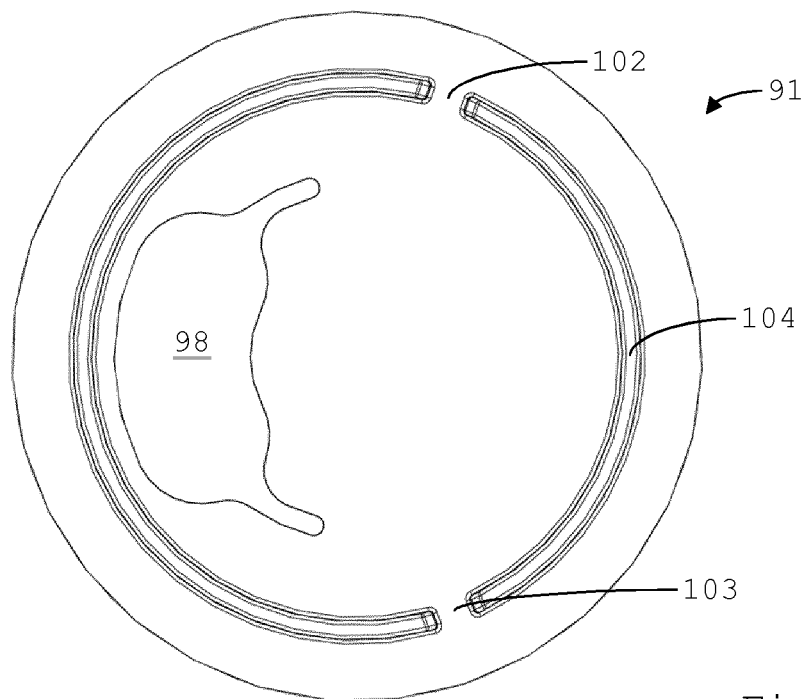
FIG. 30 is a first plan view of the movable regulating part of FIG. 29.
Figure 31:
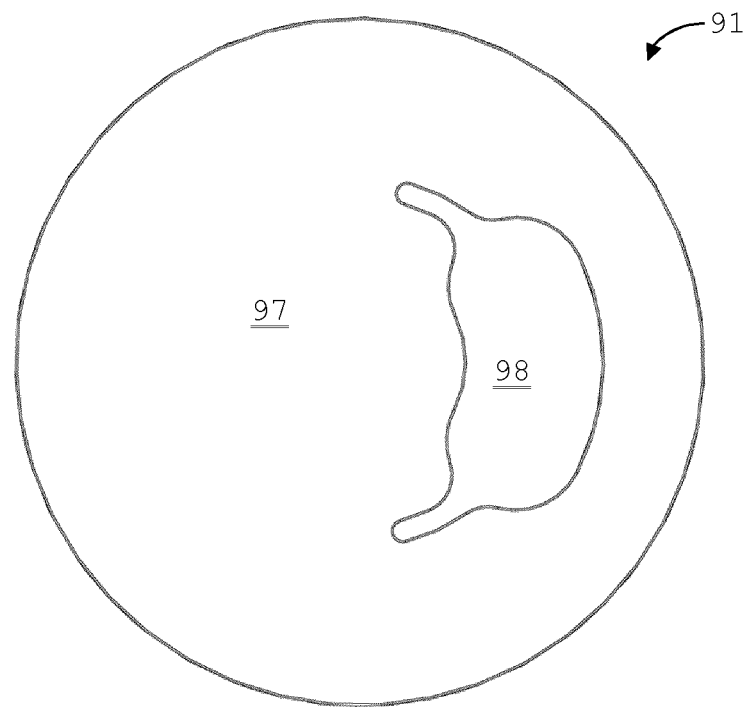
FIG. 31 is a second plan view of the movable regulating part of FIGS. 29 and 30.
Figure 32:
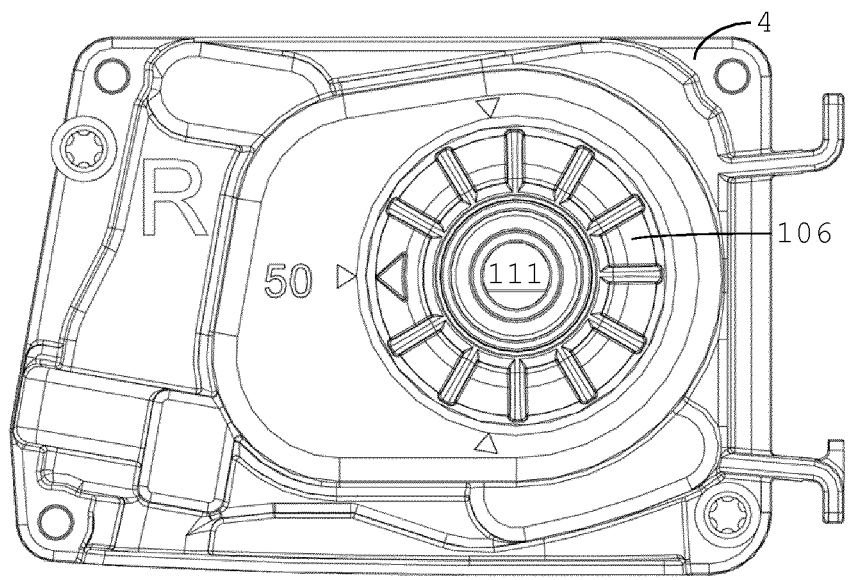
FIG. 32 is a plan view of a right part of the housing of the head part.

The movable regulating part 91 (FIGS. 29-31) is essentially disc-shaped. It is arranged for rotation in the left valve housing part 95. This valve housing part 95 defines an essentially cylindrical valve chamber. A planar surface 97 of the movable regulating part 91 (FIG. 31) faces the first ports 62,63 and is pressed against first and second left valve sealing elements 92,93 surrounding first and second first ports 62,63 respectively.

An aperture 98 is formed through the movable regulating part 91. The aperture 98 is movable between positions of varying degrees of overlap with the first ports 62,63 by varying the rotary position of the movable regulating part 91. In at least one rotary position, the aperture 98 is in a position in which it does not overlap with any of the first ports 62,63, so that they are covered by the planar surface 97. This position corresponds to the closed configuration of the left ratio-setting valve.

Figure 26:
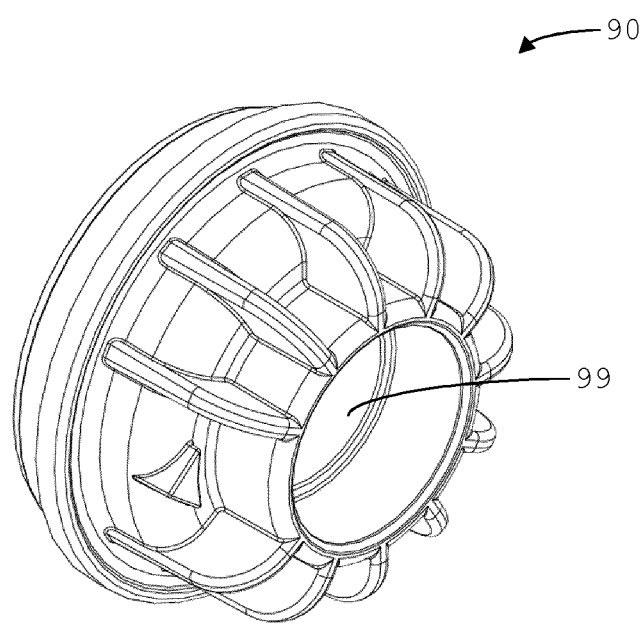
FIG. 26 is a first perspective view of an operating part of the ratio-setting valve.
Figure 27:
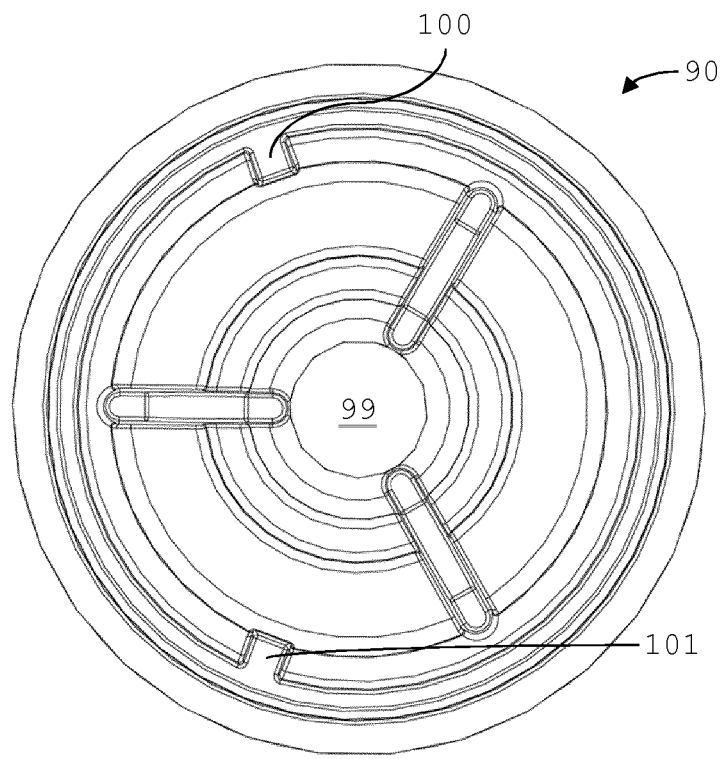
FIG. 27 is a plan view of the operating part of FIG. 26.
Figure 28:
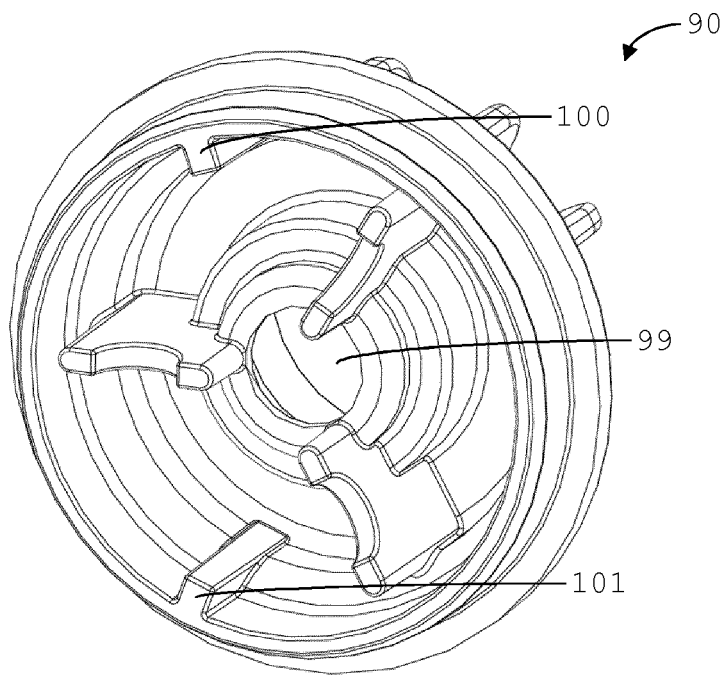
FIG. 28 is a second perspective view of the operating part of FIGS. 26 and 27.

The left valve chamber is closed by the movable operating part 90 (FIGS. 26-28), which is arranged to support a third left valve sealing element 94. This sealing element 94 is pressed against the movable regulating part 91 and surrounds a second port 99 formed in the movable operating part 90. The movable operating part 90 is thus journalled for rotation about the second port 99 about an axis fixed to the left housing part 3. Teeth 100,101 on the movable operating part 90 engage gaps 102,103 in a circular ridge 104 on the movable regulating part 91 that faces the movable operating part 90. The movable regulating part 91 is thus coupled for rotation with the movable operating part 90. The movable operating part 90 is held in place by its circumferential edge, which is located between the left housing part 3 and the left screening part 89.

Depending on the direction of flow, the second port 99 functions as the inlet or outlet of the head part 1. A conduit (not shown) can be connected to the second port 99 by means of an insert such as described, for example in EP 0 890 774 A1. The conduit may be a flexible conduit, for example.

Assuming that the second port 99 forms the inlet, the incoming flow of liquid is split into two sub-flows in the ratio-setting valve. When the ratio-setting valve is not in the closed configuration, the volumetric flow rate ratio of the two sub-flows is determined by the rotary position of the movable regulating part 91 and the movable operating part 90. The user can set this position by hand by grasping and turning the movable operating part 90, even with the conduit connected. The ratio determines the composition of the liquid mix formed in the second bed 25 of the cartridge 2. The user can also move the movable operating part in a position in which the supply of liquid is cut off altogether.

So as not to be tied to a particular direction of flow along the wall to which the head part 1 is mounted, the second port 99 of the left ratio-setting valve can also form the outlet. In that case, sub-flows of liquid are united in the left ratio-setting valve. The valve can for instance be set to a ratio of 1:1. Since the mixing of differently treated sub-flows of liquid already takes place in the second bed 25, the two sub-flows that then pass through the first ports 62,63 have the same composition.

However, if the cartridge 2 includes a membrane module (not shown) for cross-flow filtration, then the left ratio-setting valve can be used as a mixing valve to add a certain amount of retentate received through one of the first ports 62,63 to filtrate received through the other of the first ports 62,63.

In view of the reversibility of the direction of flow, the right ratio-setting valve is essentially a mirror image of the left ratio-setting valve. That is to say that it includes a right screening part 105, a right operating part 106, a right movable regulating part 107 and right valve sealing elements 108-110 (FIGS. 32-38). A second port 111 (FIG. 32) is formed in the movable valve operating part 106.

The first ports 64,65 of the right ratio-setting valve are defined in the right screening part 105, which is inserted through a right housing part aperture 112 such that it is closed except for the first ports 64,65. The left and right screening parts 89,105 are mirror images of each other. Thus, the right screening part 105 includes an integral valve housing part 113 defining an essentially cylindrical valve chamber closed by the movable operating part 106.

The regulating parts 91,107 and the operating parts 90,106 are identical.

Where the second port 111 forms the outlet, the right ratio-setting valve can be used to cut off the flow of liquid through the liquid treatment apparatus in addition to or instead of the left ratio-setting valve whilst the cartridge 2 is in its operational position.

The invention is not limited to the embodiments described above, which may be varied within the scope of the accompanying claims. A non-modular embodiment in which the first ports 62-65 are formed in the left and right housing parts 3,4 is also conceivable, for example. In that case, the valve housing parts 95,113 would be formed on the housing parts 3,4.

In an alternative embodiment, the movable regulating parts 91,107 are actuated by an actuator comprised in an electromechanical system. The actuator may include an electric motor, for example. Such a system may be arranged to set the volumetric flow rate ratio automatically, e.g. based on values of a signal from one or more sensors. The system may alternatively or additionally comprise one or more sensors for detecting a fault in the liquid treatment apparatus such as a leak and be arranged to place the ratio-setting valve in the closed configuration on detection of the fault.

LIST OF REFERENCE NUMERALS

1—head part
2—cartridge
3—left housing part
4—right housing part
5—mounting plate
6—receiving part
7—cap-shaped part
8—vessel
9—connecting head
10—cartridge axis
11—$1^{st}$ cartridge port
12—$2^{nd}$ cartridge port
13—$3^{rd}$ cartridge port
14—$4^{rd}$ cartridge port
15—$1^{st}$ surface section
16—$2^{nd}$ surface section
17—$1^{st}$ channel
18—$2^{nd}$ channel
19—$3^{rd}$ channel
20—$4^{th}$ channel
21—fall tube
22—flow distributor device
23—first bed of liquid treatment medium
24—liquid-permeable divider
25—second bed of liquid treatment medium
26—concentric flow conductor
27—liquid-permeable screen
28—$1^{st}$ alignment ridge
29—$2^{nd}$ alignment ridge
30—rounded end of $1^{st}$ alignment ridge
31—rounded end of $2^{nd}$ alignment ridge
32—$1^{st}$ curved surface section
33—$2^{nd}$ curved surface section
34—first (lower) section of first alignment ridge
35—first (lower) section of second alignment ridge
36—second (upper) section of first alignment ridge
37—second (upper) section of second alignment ridge
38—$1^{st}$ receiving part sealing element
29—$2^{nd}$ receiving part sealing element
40—$3^{rd}$ receiving part sealing element
41—$4^{th}$ receiving part sealing element
42—$5^{th}$ receiving part sealing element
43—$6^{th}$ receiving part sealing element
44—receiving part reference axis
45—$1^{st}$ receiving part port
46—$2^{nd}$ receiving part port
47—$3^{rd}$ receiving part port
48—$4^{th}$ receiving part port
49—first receiving part side wall section
50—second receiving part side wall section
51—first alignment groove
52—second alignment groove 53—first (lower) groove section of first alignment groove
54—first (lower) groove section of sec-ond alignment groove
55—second (upper) groove section of first alignment groove
56—second (upper) groove section of second alignment groove
57—left support surface
58—right support surface
59—left ledge
60—right ledge
61—bypass channel
62—$1^{st}$ first port
63—$2^{nd}$ first port
64—$3^{rd}$ first port
65—$4^{th}$ first port
66—left planar surface
67—right planar surface
68—$1^{st}$ guide protrusion
69—$2^{nd}$ guide protrusion
70—$3^{rd}$ guide protrusion
71—$4^{th}$ guide protrusion
72—$1^{st}$ guide
73—$2^{nd}$ guide
74—$3^{rd}$ guide
75—$4^{th}$ guide
76—left gap
77—right gap
78—latching device
79—left pawl
80—right pawl
81—left arm
82—right arm
83—left downward-facing facet
84—right downward-facing facet
85—left facet for engaging the receiving part
86—right facet for engaging the receiving part
87—left detent
88—right detent
89—left screening part
90—left operating part
91—left regulating part
92—$1^{st}$ left valve sealing element
93—$2^{nd}$ left valve sealing element
94—$3^{rd}$ left valve sealing element
95—left valve housing part
96—left housing part aperture
97—planar surface on regulating part
98—aperture in regulating part
99—second port of left ratio-setting valve
100—tooth on operating part
101—tooth on operating part
102—gap in circular ridge
103—gap in circular ridge
104—circular ridge
105—right screening part
106—right operating part
107—right regulating part
108—$1^{st}$ right valve sealing element
109—$2^{nd}$ right valve sealing element
110—$3^{rd}$ right valve sealing element
111—second port of right valve
112—aperture in right housing part
113—part defining right valve housing

The invention claimed is:

1. A device for forming at least part of a head part of a liquid treatment apparatus,
   wherein the device is arranged to receive a connecting head of a replaceable liquid treatment cartridge and includes at least one ratio-setting valve,
   wherein the ratio-setting valve is provided with at least two first ports, each placeable in essentially sealed liquid communication with respective cartridge ports of a connecting head of a replaceable liquid treatment cartridge inserted into the device, and with at least one second port,
   wherein the ratio-setting valve includes at least one movable regulating part for setting a volumetric flow rate ratio between a first flow of liquid between a first of the first ports and the at least one second port and a second flow of liquid between a second of the first ports and the at least one second port at any of a plurality of values, and
   wherein the ratio-setting valve is placeable in a closed configuration, in which the at least one movable regulating part is positioned such that both the first and the second flows are blocked, and
   wherein the ratio-setting valve is placeable in the closed configuration independently of whether a connecting head is inserted with its cartridge ports in liquid communication with the first ports.

2. The device according to claim 1, further including:
   a receiving part including at least one cavity for receiving at least a part of the connecting head including at least one of the cartridge ports such that the cartridge port is in sealed liquid communication with a receiving part port, wherein the receiving part is arranged to receive a connecting head provided with at least two cartridge ports such that each of the cartridge ports of the connecting head are in sealed liquid communication with a respective receiving part port; and
   at least one valve mechanism, operable by the liquid treatment cartridge, for interrupting flows of liquid between the first ports and respective ones of the receiving part ports.

3. The device according to claim 2, wherein the at least one valve mechanism is additional to the ratio-setting valve.

4. The device according to claim 2, including a part for engaging the liquid treatment cartridge when the connecting head is inserted into the device
   wherein the liquid treatment cartridge is movable with the engaging part between a first and a second position relative to a main part of the device whilst the connecting head is inserted, and
   wherein a position of the engaging part relative to the main part determines a state of the valve mechanism, the first ports being in liquid communication with the receiving part ports only in the second of the first and second positions.

5. The device according to claim 4, wherein the receiving part is arranged to engage the liquid treatment cartridge when the connecting head is inserted into the cavity of the receiving part.

6. The device according to claim 2,
   wherein the device includes at least one inlet and at least one outlet for liquid,
   wherein the second port is at least placeable in liquid communication with one of at least one of the inlets and one of the outlets, and
   wherein the valve mechanism is arranged to place the first ports in liquid communication with the other of at least one of the inlet and at least one of the outlets when the flows of liquid between the first ports and respective ones of the receiving part ports are interrupted.

7. The device according to claim 1,
   wherein the device is provided with at least one inlet and at least one outlet for liquid and at least two of the ratio-setting valves, and
   wherein the second port of a first of the ratio-setting valves is at least placeable in liquid communication with at least one of the inlets and the second port of a second of the ratio-setting valves is at least placeable in liquid communication with at least one of the outlets.

8. The device according to claim 1, including a receiving part including a cavity provided with multiple receiving part ports placeable in sealed liquid communication with the respective cartridge ports on insertion of the connecting head into the cavity.

9. The device according to claim 8, wherein the receiving part includes a cavity provided with at least three receiving part ports.

10. The device according to claim 9, wherein the cavity is provided with at least four receiving part ports.

11. The device according to claim 1, including a movable operating part for at least placing the ratio-setting valve in and out of the closed configuration.

12. The device according to claim 11, wherein the movable operating part is journalled for rotation about an axis fixed with respect to the device.

13. The device according to claim 12, wherein the movable operating part is arranged such that liquid conducted through at least one of the first ports and the second port is led through a central section of the movable operating part.

14. The device according to claim 11,
wherein the at least one moveable regulating part includes a regulating part having a surface sealingly placed against the first ports and having an aperture therein, the aperture being moveable between positions of varying degrees of overlap with the first ports and into at least one position out of overlap with any of the first ports, and
wherein the regulating part is one of coupled for movement with and comprised in the movable operating part.

15. The device according to claim 1, wherein the at least one movable regulating part includes a regulating part having a surface sealingly placed against the first ports and having an aperture therein, the aperture being movable between positions of varying degrees of overlap with the first ports and into at least one position out of overlap with any of the first ports.

16. The device according to claim 15, wherein the regulating part is rotatable and the positions correspond to rotary positions.

17. A liquid treatment apparatus including a head part including at least one device according to claim 1 and at least one replaceable liquid treatment cartridge.

18. A liquid treatment apparatus according to claim 17, wherein at least three cartridge ports in liquid communication with an interior of the liquid treatment cartridge are provided in the connecting head.

19. The liquid treatment apparatus according to claim 18, wherein at least four cartridge ports in liquid communication with an interior of the liquid treatment cartridge are provided in the connecting head.

20. The liquid treatment apparatus according to claim 17, wherein the at least one device includes a moveable operating part for at least placing the ratio-setting valve in and out of the closed configuration.

* * * * *